United States Patent
Chevalier et al.

(10) Patent No.: US 12,365,818 B2
(45) Date of Patent: *Jul. 22, 2025

(54) COMPOSITION FOR PREPARING A RELEASE COATING

(71) Applicant: DOW SILICONES CORPORATION, Midland, MI (US)

(72) Inventors: Pierre Chevalier, Seneffe (BE); Zhenbin Niu, Midland, MI (US); Sze-Sze Ng, Midland, MI (US); Sébastien Grofils, Seneffe (BE); Lori Dehlin, Midland, MI (US); Deana Dujardin, Seneffe (BE); Alex Knott, Seneffe (BE); David Rich, Midland, MI (US); Thomas Bekemeier, Midland, MI (US); Timothy P. Mitchell, Midland, MI (US); Dongchan Ahn, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 483 days.

This patent is subject to a terminal disclaimer.

(21) Appl. No.: 17/780,542

(22) PCT Filed: Dec. 2, 2020

(86) PCT No.: PCT/US2020/062833
§ 371 (c)(1),
(2) Date: May 27, 2022

(87) PCT Pub. No.: WO2021/113321
PCT Pub. Date: Jun. 10, 2021

(65) Prior Publication Data
US 2023/0047536 A1    Feb. 16, 2023

Related U.S. Application Data

(60) Provisional application No. 62/942,679, filed on Dec. 2, 2019.

(51) Int. Cl.
*C09J 7/21* (2018.01)
*C09J 7/20* (2018.01)
*C09J 7/40* (2018.01)

(52) U.S. Cl.
CPC ............... *C09J 7/401* (2018.01); *C09J 7/201* (2018.01); *C09J 7/21* (2018.01); *C09J 2400/283* (2013.01); *C09J 2483/005* (2013.01)

(58) Field of Classification Search
CPC ..... C09J 7/401; C09J 7/201; C09J 7/21; C09J 2400/283; C09J 2483/005; C08G 77/06; C08G 77/08; C08G 77/12; C08G 77/20; C08G 77/70; C08L 83/04; C09D 183/04; C08J 7/04

See application file for complete search history.

(56) References Cited

U.S. PATENT DOCUMENTS

| | | | |
|---|---|---|---|
| 6,511,714 B2 | 1/2003 | Branlard et al. | |
| 6,727,338 B1 | 4/2004 | Kilgour et al. | |
| 6,764,717 B2 | 7/2004 | Herzig et al. | |
| 6,774,201 B2 | 8/2004 | Kilgour et al. | |
| 8,685,499 B2 | 4/2014 | Martin et al. | |
| 8,722,153 B2 | 5/2014 | Ekeland | |
| 8,747,997 B2 | 6/2014 | Heilman et al. | |
| 9,275,560 B2 | 3/2016 | Zhang et al. | |
| 2010/0166970 A1 | 7/2010 | Ekeland | |
| 2011/0287267 A1* | 11/2011 | Hori | C09J 7/40 428/447 |
| 2012/0301644 A1 | 11/2012 | Blackwood et al. | |
| 2015/0376481 A1 | 12/2015 | Larson et al. | |
| 2019/0367744 A1 | 12/2019 | Chevalier et al. | |

FOREIGN PATENT DOCUMENTS

| | | |
|---|---|---|
| CN | 104968749 A | 10/2015 |
| CN | 110168032 A | 8/2019 |
| WO | 2008084747 A2 | 7/2008 |
| WO | 2008140762 A2 | 11/2008 |
| WO | 2010061967 A1 | 6/2010 |
| WO | 2018112911 A1 | 6/2018 |
| WO | 2019140197 A1 | 7/2019 |

OTHER PUBLICATIONS

International Search Report for PCT/US2020/062833 dated Mar. 16, 2021, 5 pages.

* cited by examiner

*Primary Examiner* — Michael B Nelson
(74) *Attorney, Agent, or Firm* — Warner Norcross + Judd LLP

(57) ABSTRACT

A composition for forming a release coating is disclosed. The composition comprises (A) an organopolysiloxane comprising the reaction product of: (i) a silicone resin having a particular formula; and (ii) a cyclic siloxane; in the presence of a polymerization catalyst. The composition further comprises (B) an organopolysiloxane including an average of at least two silicon-bonded ethylenically unsaturated groups per molecule.

15 Claims, No Drawings

COMPOSITION FOR PREPARING A RELEASE COATING

CROSS-REFERENCE TO RELATED APPLICATIONS

This application is the U.S. National Stage of International Application No. PCT/US2020/062833 filed on 2 Dec. 2020, which claims priority to and all advantages of U.S. Provisional Patent Application No. 62/942,679 filed on 2 Dec. 2019, the content of which is incorporated herein by reference.

TECHNICAL FIELD

The subject disclosure generally relates to a composition and, more specifically, to a composition for preparing a release coating and related methods.

BACKGROUND

Silicone compositions are known in the art and utilized in myriad industries and end use applications. One such end use application is to form release coatings or liners from which adhesives can be removed. For example, silicone compositions may be utilized to coat various substrates, such as paper, to give release liners for laminating pressure sensitive adhesives (e.g. tapes). Such silicone compositions are typically addition-curable.

Conventional release liners are typically formed by addition reacting (or hydrosilylating) an organopolysiloxane having an unsaturated hydrocarbon group and an organohydrogenpolysiloxane in the presence of a hydrosilylation reaction catalyst. In certain applications, release liners are formed at high speeds via a coating process. However, during such processes of preparing release liners, mists often form. It is desirable to minimize formation of such mists without impacting performance properties of the release liners.

BRIEF SUMMARY

A composition for forming a release coating is disclosed. The composition comprises (A) an organopolysiloxane comprising the reaction product of:

(i) a silicone resin having the formula $(R^1{}_y R^2{}_{3-y} SiO_{1/2})_x (SiO_{4/2})_{1.0}(ZO_{1/2})_w$, wherein each $R^1$ is an independently selected hydrocarbyl group having from 1 to 32 carbon atoms; each $R^2$ is independently selected from $R^1$, an alkoxy group, and a hydroxyl group; Z is independently H or an alkyl group; y is an integer from 1 to 3 and is independently selected in each siloxy unit indicated by subscript x; subscript x is from 0.05 to 0.99; and subscript w is from 0 to 3; and (ii) a cyclic siloxane having the formula $(R^1{}_2 SiO_{2/2})_n$, where $R^1$ is defined above and n is an integer from 3 to 15;
in the presence of a polymerization catalyst.

The composition further comprises (B) an organopolysiloxane including an average of at least two silicon-bonded ethylenically unsaturated groups per molecule.

A method of preparing the composition is also disclosed. In addition, a method of preparing a coated substrate comprising a release coating disposed on a substrate, as well as the coated substrate formed in accordance with the method, are disclosed.

DETAILED DESCRIPTION OF THE INVENTION

A composition for forming a release coating is disclosed. The composition comprises (A) an organopolysiloxane comprising the reaction product of:

(i) a silicone resin having the formula $(R^1{}_y R^2{}_{3-y} SiO_{1/2})_x (SiO_{4/2})_{1.0}(ZO_{1/2})_w$, wherein each $R^1$ is an independently selected hydrocarbyl group having from 1 to 32 carbon atoms; each $R^2$ is independently selected from $R^1$, an alkoxy group, and a hydroxyl group; Z is independently H or an alkyl group; y is an integer from 1 to 3 and is independently selected in each siloxy unit indicated by subscript x; subscript x is from 0.05 to 0.99; and subscript w is from 0 to 3; and (ii) a cyclic siloxane having the formula $(R^1{}_2 SiO_{2/2})_n$, where $R^1$ is defined above and n is an integer from 3 to 15;
in the presence of a polymerization catalyst.

The (i) silicone resin may alternatively be referred to as an MQ resin, where M designates $(R^0 SiO_{3/2})$ siloxy units, and Q designates $(SiO_{4/2})$ siloxy units, where $R^0$ designates a silicon-bonded substituent. Such MQ resins are known in the art and are often in solid (e.g. powder or flake) form unless disposed in a solvent. As understood in the art, at least some of the silicon atoms in the Q siloxy units may include SiOZ moieties (i.e., silicon-bonded hydroxyl groups or alkoxy groups). Such SiOZ moieties present in the Q siloxy units is acknowledged via the $ZO_{1/2}$ moiety indicated by subscript w. The (i) silicone resin is free from any D or T siloxy units including silicon-bonded organic groups.

The (i) silicone resin has the average formula $(R^1{}_y R^2{}_{3-y} SiO_{1/2})_x (SiO_{4/2})_{1.0}(ZO_{1/2})_w$, which can alternatively be recited as $[M]_x[Q]$. However, typically in the nomenclature utilized in the art, M siloxy units are trimethylsiloxy units, whereas $R^1$ and $R^2$ in the (i) silicone resin need not be methyl groups. In the (i) silicone resin, subscript x refers to the molar ratio of M siloxy units to Q siloxy units when the number of moles of Q siloxy units is normalized to 1. The greater the value of x, the lesser the crosslink density of the (i) silicone resin. The inverse is also true, because as the value of x decreases, the number of M siloxy units decreases, and thus more Q siloxy units are networked without termination via an M siloxy unit. The fact that the formula for the (i) silicone resin normalizes the content of Q siloxy units to 1 does not imply that the (i) silicone resin includes only one Q unit. Typically, the (i) silicone resin includes a plurality of Q siloxy units clustered or bonded together. In addition, for purposes of this disclosure and the average formula above, siloxy units including silicon-bonded hydroxyl groups that are not fully condensed or capped may be considered Q siloxy units (so long as the silicon atom including silicon-bonded hydroxyl group(s) does not include any silicon-carbon bond). Such silicon-bonded hydroxyl groups can condense to result in Q siloxy units. Thus, even after bodying the (i) silicone resin, as described below, the value of subscript x, and the ratio of M to Q siloxy units, remains the same after further condensation of any residual silicon-bonded hydroxyl groups present in Q siloxy units. For example, the (i) silicone resin may include, in certain embodiments, up to 10, alternatively up to 8, alternatively up to 6, alternatively up to 5, alternatively up to 4, alternatively up to 3, alternatively up to 2, weight percent of hydroxyl groups. When not accounting for any SiOZ content in the Q siloxy units, the (i) silicone resin has the average formula $(R^1{}_y R^2{}_{3-y} SiO_{1/2})_x (SiO_{4/2})_{1.0}$.

In the (i) silicone resin, subscript x is from 0.05 to 0.99, alternatively from 0.10 to 0.95, alternatively from 0.15 to 0.90, alternatively from 0.20 to 0.85, alternatively from 0.25 to 0.80, alternatively from 0.30 to 0.75. In specific embodiments, subscript x is from 0.50 to 0.80, alternatively from 0.55 to 0.75, alternatively from 0.60 to 0.75, alternatively from 0.65 to 0.75, alternatively from 0.70 to 0.75. In another specific embodiment, subscript x is from 0.05 to 0.85. In yet another specific embodiment, subscript x is from 0.4 to 0.90, alternatively from 0.70 to 0.85. Thus, on a molar basis, there are more Q siloxy units than M siloxy units in the (i) silicone resin.

Subscript w is from 0 to 3, alternatively from 0 to 2, alternatively from 0 to 1, alternatively from 0 to 0.9, alternatively from 0 to 0.8, alternatively from 0 to 0.7, alternatively from 0 to 0.6, alternatively from 0 to 0.5, alternatively from 0 to 0.4, alternatively from 0 to 0.3, alternatively from 0 to 0.2, alternatively from 0 to 0.1, and represents the SiOZ content of the (i) silicone resin. SiOZ content can be SiOH (where Z is H, or a silanol group), or silicon-bonded alkoxy (where Z is alkyl). For example, "$(SiO_{4/2})(ZO_{1/2})$" refers to a Q-type group with a silicon atom bound through a single oxygen to a "Z" group. Under NMR nomenclature, such "$(SiO_{4/2})(ZO_{1/2})$" moieties are still considered Q siloxy units. When Z is an alkyl group, the alkyl group is typically a C1-C8, alternatively a C1-C6, alternatively a C1-C4, alternatively a C1-C2, alternatively a C1 (i.e., methyl) alkyl group.

In general, hydrocarbyl groups suitable for $R^1$ may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g. isopentyl, neopentyl, and/or tert-pentyl), hexyl, hexadecyl, octadecyl, as well as branched saturated hydrocarbon groups having from 6 to 18 carbon atoms. Examples of suitable non-conjugated cyclic groups include cyclobutyl, cyclohexyl, and cyclyoheptyl groups. Examples of suitable aryl groups include phenyl, tolyl, xylyl, naphthyl, benzyl, and dimethyl phenyl. Examples of suitable alkenyl groups include vinyl, allyl, propenyl, iso-propenyl, butenyl, isobutenyl, pentenyl, heptenyl, hexenyl, octenyl, hexadecenyl, octadecenyl and cyclohexenyl groups. Examples of suitable monovalent halogenated hydrocarbon groups (i.e., halocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups.

In specific embodiments, each $R^1$ is independently selected from alkyl groups having from 1 to 32, alternatively from 1 to 28, alternatively from 1 to 24, alternatively from 1 to 20, alternatively from 1 to 16, alternatively from 1 to 12, alternatively from 1 to 8, alternatively from 1 to 4, alternatively 1, carbon atoms, and from ethylenically unsaturated (i.e., alkenyl and/or alkynyl groups) groups having from 2 to 32, alternatively from 2 to 28, alternatively from 2 to 24, alternatively from 2 to 20, alternatively from 2 to 16, alternatively from 2 to 12, alternatively from 2 to 8, alternatively from 2 to 4, alternatively 2, carbon atoms. "Alkenyl" means an acyclic, branched or unbranched, monovalent hydrocarbon group having one or more carbon-carbon double bonds. Specific examples thereof include vinyl groups, allyl groups, hexenyl groups, and octenyl groups. "Alkynyl" means an acyclic, branched or unbranched, monovalent hydrocarbon group having one or more carbon-carbon triple bonds. Specific examples thereof include ethynyl, propynyl, and butynyl groups. Various examples of ethylenically unsaturated groups include $CH_2=CH—$, $CH_2=CHCH_2—$, $CH_2=CH(CH_2)_4—$, $CH_2=CH(CH_2)_6—$, $CH_2=C(CH_3)CH_2—$, $H_2C=C(CH_3)—$, $H_2C=C(CH_3)—$, $H_2C=C(CH_3)CH_2—$, $H_2C=CHCH_2CH_2—$, $H_2C=CHCH_2CH_2CH_2—$, $HC\equiv C—$, $HC\equiv CCH_2—$, $HC\equiv CCH(CH_3)—$, $HC\equiv CC(CH_3)_2—$, and $HC\equiv CC(CH_3)_2CH_2—$. Typically, when $R^1$ is an ethylenically unsaturated group, the ethylenic unsaturation is terminal in $R^1$. As understood in the art, ethylenic unsaturation may be referred to as aliphatic unsaturation.

When at least one $R^1$ is an ethylenically unsaturated group, i.e., an alkenyl or alkynyl group, the (A) organopolysiloxane formed from the (i) silicone resin can participate in an addition or hydrosilylation reaction to give a coating, e.g. a release coating, as described above. However, the (A) organopolysiloxane provides surprising benefits even when each $R^1$ is an alkyl group such that the (A) organopolysiloxane is not functionalized or reactive, particularly with respect to anti-mist properties when forming release coatings.

In specific embodiments, each $R^1$ in the (i) silicone resin is an independently selected alkyl group. In these embodiments, when each $R^1$ is methyl and y is 3, the (i) silicone resin has the formula $((CH_3)_3SiO_{1/2})_x(SiO_{4/2})_{1.0}(ZO_{1/2})_w$. In other embodiments, at least one $R^1$ in the (i) silicone resin is an ethylenically unsaturated group. When at least one $R^1$ in the (i) silicone resin is a vinyl group (as the ethylenically unsaturated group), each of the remaining $R^1$ are methyl groups, and when subscript y is 3, the (i) silicone resin can include any combination of the following M siloxy units, as long as at least one M siloxy unit including a silicon-bonded vinyl group is present: $((CH_3)_3SiO_{1/2})$, $((CH_3)_2(CH=CH_2)SiO_{1/2})$, $((CH_3)(CH=CH_2)_2SiO_{1/2})$, and $((CH=CH_2)_3SiO_{1/2})$. Typically, when the (i) silicone resin includes at least one silicon-bonded alkenyl group, such as vinyl, as $R^1$, with the balance of $R^1$ being alkyl groups, e.g. methyl groups, the (i) silicone resin includes M siloxy units selected from $((CH_3)_3SiO_{1/2})$ and $((CH_3)_2(CH=CH_2)SiO_{1/2})$. It is to be understood that the above examples are exemplary only, and any methyl group may be replaced with any other alkyl or even hydrocarbyl group, and any vinyl group may be replaced with any other alkenyl or ethylenically unsaturated group.

$R^2$ is independently selected from $R^1$, an alkoxy group, and a hydroxyl group. Typically, each $R^2$ is independently selected from $R^1$. However, as understood in the art, the (i) silicone resin may inherently include some amount of silicon-bonded hydroxyl and/or alkoxy groups resulting from formation of the (i) silicone resin, which is typically obtained via cohydrolysis/condensation. Thus, one or more of $R^2$ may be an alkoxy group or a hydroxyl group, even though such alkoxy groups or hydroxyl groups are typically not intentionally included in the (i) silicone resin.

Subscript y is an integer from 0 to 3, alternatively from 1 to 3, alternatively from 2 to 3, alternatively 3. In addition, subscript y is independently selected in each M siloxy unit indicated by subscript x. Thus, the (i) silicone resin could include, for example, M siloxy units represented by $(R^1_3SiO_{1/2})$, when y is 3, and $(R^1_2R^2SiO_{1/2})$, when y is 2. Typically, a majority, i.e., at least 50, alternatively at least 60, alternatively at least 70, alternatively at least 80, alternatively at least 90, alternatively at least 95, mole % of all M siloxy units in the (i) silicone resin are represented by $(R^1_3SiO_{1/2})$. All M siloxy units in the (i) silicone resin are aggregated for purposes of subscript x, defined above.

By way of example only, exemplary species of the (i) silicone resin include $[(CH_3)_3SiO_{1/2}]_{0.7}[SiO_{4/2}]$ and $[(CH_3)_2(CH=CH_2)SiO_{1/2}]_{0.7}[SiO_{4/2}]$. Another exemplary species includes $[(CH_3)_3SiO_{1/2}]$ and $[(CH_3)_2(CH=CH_2)SiO_{1/2}]$ units in combination with Q siloxy units.

The (i) silicone resin is reacted with (ii) a cyclic siloxane having the formula $(R^1_2SiO_{2/2})_n$, where $R^1$ is defined above and n is an integer from 3 to 15, to give the (A) organopolysiloxane. In the cyclic siloxane, each $R^1$ is typically an independently selected alkyl group, and most typically, each $R^1$ is a methyl group. When each $R^1$ is a methyl group, the (ii) cyclic siloxane may be referred to based on n. For example, when n is 3, the (ii) cyclic siloxane is referred to as D3; when n is 4, the (ii) cyclic siloxane is referred to as D4; when n is 5, the (ii) cyclic siloxane is referred to as D5; etc. In other embodiments, however, at least one $R^1$ of the (ii) cyclic siloxane is a silicon-bonded ethylenically unsaturated group, i.e., a silicon bonded alkenyl or alkynyl group. For example, when at least one $R^1$ of the (ii) cyclic siloxane is a silicon-bonded ethylenically unsaturated group, the (ii) cyclic siloxane may comprise, for example, methylvinylsiloxy units, or divinylsiloxy units. Each D siloxy unit of the (ii) cyclic siloxane is independently selected such that methylvinylsiloxy units may be present in combination with dimethylsiloxy units.

Subscript n is from 3 to 15, alternatively from 3 to 12, alternatively from 3 to 10, alternatively from 3 to 8, alternatively from 3 to 6, alternatively from 4-5. In addition, the (ii) cyclic siloxane may comprise a blend of different cyclic siloxanes, e.g. a blend of those where n is 4 and where n is 5. In specific embodiments, the (ii) cyclic siloxane is selected from the group of cyclotrisiloxanes, cyclotetrasiloxanes such as octamethylcyclotetrasiloxane, cyclopentasiloxanes such as decamethylcyclopentasiloxane, cyclohexasiloxanes, and combinations thereof. For descriptive purposes only, chemical structures of decamethylcyclopentasiloxane and octamethylcyclotetrasiloxane are shown below:

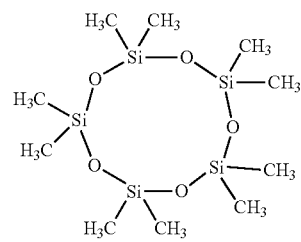

Decamethylcyclopentasiloxane

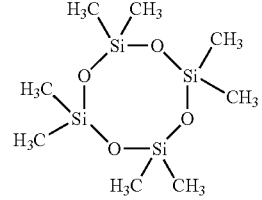

Octamethylcyclotetrasiloxane

The (ii) cyclic siloxane typically has a molecular weight from 100 to 750, alternatively from 150 to 500, and alternatively from 275 to 375, g/mol.

The (i) silicone resin and the (ii) cyclic siloxane are reacted in the presence of a polymerization catalyst. Typically, the polymerization catalyst is an acid or a base such that the reaction between the (i) silicone resin and the (ii) cyclic siloxane is either an acid catalyzed or a base catalyzed reaction. As such, in certain embodiments, the polymerization catalyst may be selected from the group of strong acid catalysts, strong base catalysts, and combinations thereof. The strong acid catalyst may be trifluoromethane sulfonic acid and the like. The polymerization catalyst is typically a strong base catalyst. Typically, this strong base catalyst is a phosphazene catalyst, although other strong base catalysts, such as KOH, can be utilized in lieu of the phosphazene base catalyst.

The phosphazene catalyst, which generally includes at least one —(N=P<)— unit (i.e., a phosphazene unit) and is usually an oligomer having up to 10 such phosphazene units, for example having an average of from 1.5 up to 5 phosphazene units. The phosphazene catalyst may be, for example, a halophosphazene, such as a chlorophosphazene (phosphonitrile chloride), an oxygen-containing halophosphazene, an ionic derivative of a phosphazene such as a phosphazenium salt, particularly an ionic derivative of a phosphonitrile halide such as a perchlorooligophosphazenium salt, or a partially hydrolyzed form thereof.

In specific embodiments, the polymerization catalyst comprises a phosphazene base catalyst. The phosphazene base catalyst may be any known in the art but typically has the following chemical formula:

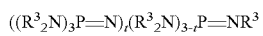

wherein each $R^3$ is independently selected from the group of a hydrogen atom, $R^1$, and combinations thereof, and t is an integer from 1 to 3. If $R^3$ is a $R^1$, then $R^3$ is typically an alkyl group having from 1 to 20, alternatively from 1 to 10, alternatively from 1 to 4, carbon atoms. The two $R^3$ groups in the any $(R^3_2N)$ moiety may be bonded to the same nitrogen (N) atom and linked to complete a heterocyclic ring preferably having 5 or 6 members.

Alternatively, the phosphazene base catalyst may be a salt and have one of the following alternative chemical formulas:

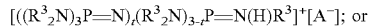; or

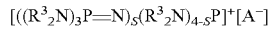

wherein each $R^3$ is independently selected and defined above, subscript t is defined above, subscript s is an integer from 1 to 4, and [A] is an anion and is typically selected from the group of fluoride, hydroxide, silanolate, alkoxide, carbonate and bicarbonate. In one embodiment, the phosphazene base is an aminophosphazenium hydroxide.

The reaction of the (i) silicone resin and the (ii) cyclic siloxane in the presence of the polymerization catalyst results in ring-opening of the (ii) cyclic siloxane and incorporation of D siloxy units into the (A) organopolysiloxane. The relative amounts of the (i) silicone resin and the (ii) cyclic siloxane utilized are a function of the desired content of D siloxy units in the (A) organopolysiloxane, which is described below. The number of D siloxy units in the (A) organopolysiloxane may be referred to as the degree of polymerization (DP) of the (A) organopolysiloxane, although the (A) organopolysiloxane includes branching attributable to the Q siloxy units and is not linear.

In certain embodiments, the (i) silicone resin and the (ii) cyclic siloxane are reacted at an elevated temperature, e.g. from 125 to 175° C., in the presence of a solvent. Suitable solvents may be hydrocarbons. Suitable hydrocarbons include aromatic hydrocarbons such as benzene, toluene, or xylene; and/or aliphatic hydrocarbons such as heptane, hexane, or octane. Alternatively, the solvent may be a halogenated hydrocarbon such as dichloromethane, 1,1,1-trichloroethane or methylene chloride. A complexing agent, such as bis(trimethylsilyl)hydrogen phosphate may be utilized after the reaction to inhibit the activity of the polymerization catalyst. One of skill in the art can readily determine a catalytic quantity of the polymerization catalyst to be utilized, which is a function of its selection and reaction conditions.

The (i) silicone resin may optionally be bodied prior to reacting the (i) silicone resin and the (ii) cyclic siloxane. As understood in the art, bodying a silicone resin typically results in an increase of molecular weight through further condensation of any residual silicon-bonded hydroxy groups that may be present in the silicone resin from its formation. Bodying the (i) silicone resin typically comprises heating the (i) silicone resin at an elevated temperature, generally while the (i) silicone resin is disposed in a solvent. Suitable solvents are disclosed above. Bodying of the (i) silicone resin results in water as a byproduct from condensation of silanol groups.

The (A) organopolysiloxane has the formula $(R^1_y R^2_{3-y} SiO_{1/2})_x (R^1_2 SiO_{2/2})_m (SiO_{4/2})_{1.0} (ZO_{1/2})_w$, where each $R^1$ and $R^2$ is independently selected and defined above, each Z is independently selected and defined above, subscripts y, x, and w are defined above, and wherein subscript m is from 3 to 3,000. The D siloxy units, i.e., $(R^1_2 SiO_{2/2})$ units, are formed from ring-opening of the (ii) cyclic siloxane and polymerization. The D siloxy units are inserted between certain M siloxy units and Q siloxy units. However, the number of M siloxy units and Q siloxy units is typically the same between the (i) silicone resin and the (A) organopolysiloxane, with the only distinction being the presence of the D siloxy units in the (A) organopolysiloxane that are absent from the (i) silicone resin. The number of D siloxy units present between each particular Q and M siloxy unit in any given linear siloxane moiety may vary in each case. The formula above represents all D units present in the (A) organopolysiloxane without regard to their location in the (A) organopolysiloxane. Typically, because there are more Q siloxy units than M siloxy units in the (A) organopolysiloxane on a molar basis, not every Q siloxy unit in the (A) organopolysiloxane is bonded to a D siloxy unit. Instead, a number of Q siloxy units are typically clustered in the (A) organopolysiloxane. Generally, D siloxy units are not present between Q siloxy units in the (A) organopolysiloxane; D siloxy units are only present between M siloxy units and Q siloxy units. Thus, the (A) organopolysiloxane includes a highly branched moiety of Q siloxy units bonded together.

In certain embodiments, m is from 3 to 3,000, alternatively from 3 to 2,000, alternatively from 3 to 1,000, alternatively from 3 to 750, alternatively from 3 to 500, alternatively from 50 to 500, alternatively from 100 to 500, alternatively from 110 to 475, alternatively from 120 to 450, alternatively from 130 to 425, alternatively from 140 to 400, alternatively from 150 to 375, alternatively from 160 to 350, alternatively from 170 to 325, alternatively from 180 to 300, alternatively from 190 to 275, alternatively from 200 to 250.

One exemplary species of the (A) organopolysiloxane is $[(CH_3)_3 SiO_{1/2}]_{0.7}[(CH_3)_2 SiO_{2/2}]_{221}[SiO_{4/2}]$. In this exemplary species, x is 0.7, each $R^1$ is methyl, and m is 221. As understood in the art, 0.7 is merely the ratio of M siloxy units to Q siloxy units, and does not relate to the molar fraction of D siloxy units in the (A) organopolysiloxane. Thus, for this exemplary species of the (A) organopolysiloxane, the (i) silicone resin utilized has formula $[(CH_3)_3 SiO_{1/2}]_{0.7}[SiO_{4/2}]$. On a molar basis, this exemplary species of the (A) organopolysiloxane can be rewritten as $[((CH_3)_3 SiO_{1/2})]_{0.0031}[(CH_3)_2 SiO_{2/2}]_{0.9924}[SiO_{4/2}]_{0.0045}$. This species is merely exemplary, and the methyl groups in the M siloxy units can be replaced with other hydrocarbyl groups, including ethylenically unsaturated groups, and the vales of x and m can be modified from this exemplary species.

The composition comprises the (A) organopolysiloxane in an amount of from greater than 0 to 15, alternatively from 0.5 to 10, alternatively from 0.75 to 7, alternatively from 1 to 4, weight percent based on the total weight of the composition.

The composition further comprises (B) an organopolysiloxane having an average of at least two silicon-bonded ethylenically unsaturated groups per molecule. In certain embodiments, the (B) organopolysiloxane has an average, per molecule, of at least two silicon bonded groups having terminal aliphatic unsaturation. This (B) organopolysiloxane may be linear, branched, partly branched, cyclic, resinous (i.e., have a three-dimensional network), or may comprise a combination of different structures. The polyorganosiloxane may have average formula: $R^4_a SiO_{(4-a)/2}$, where each $R^4$ is independently selected from a monovalent hydrocarbon group or a monovalent halogenated hydrocarbon group, with the proviso that in each molecule, at least two of $R^4$ include aliphatic unsaturation, and where subscript a is selected such that $0<a\leq3.2$. Suitable monovalent hydrocarbon groups and monovalent halogenated hydrocarbon groups for $R^4$ are as described above for $R^1$. The average formula above for the polyorganosiloxane may be alternatively written as $(R^4_3 SiO_{1/2})_b (R^4_2 SiO_{2/2})_c (R^4 SiO_{3/2})_d (SiO_{4/2})_e$, where $R^4$ is defined above, and subscripts b, c, d, and e are each independently from $\geq 0$ to $\leq 1$, with the proviso that a quantity $(b+c+d+e)=1$. One of skill in the art understands how such M, D, T, and Q units and their molar fractions influence subscript a in the average formula above. T units (indicated by subscript d), Q units (indicated by subscript e) or both, are typically present in polyorganosiloxane resins, whereas D units, indicated by subscript c, are typically present in polyorganosiloxane polymers (and may also be present in polyorganosiloxane resins or branched polyorganosiloxanes).

Alternatively, the (B) organopolysiloxane may be substantially linear, alternatively is linear. The substantially linear organopolysiloxane may have the average formula: $R^4_{a'}SiO_{(4-a')/2}$, where each $R^4$ and is as defined above, and where subscript a' is selected such that $1.9 \leq a' \leq 2.2$.

At 25° C., the substantially linear organopolysiloxane of component (B) may be a flowable liquid or may have the form of an uncured rubber. The substantially linear organopolysiloxane may have a viscosity of from 10 mPa·s to 30,000,000 mPa·s, alternatively from 10 mPa·s to 10,000 mPa·s, alternatively from 100 mPa·s to 1,000,000 mPa·s, and alternatively from 100 mPa·s to 100,000 mPa·s at 25° C. Viscosity may be measured at 25° C. via a Brookfield LV DV-E viscometer with a spindle selected as appropriate to the viscosity of the substantially linear polyorganosiloxane, i.e., RV-1 to RV-7.

Alternatively, when the (B) organopolysiloxane is substantially linear or linear, the (B) organopolysiloxane may have the average unit formula: $(R^6R^5_2SiO_{1/2})_{aa}(R^6R^5SiO_{2/2})_{bb}(R^6_2SiO_{2/2})_{cc}(R^5_3SiO_{1/2})_{dd}$, where each $R^5$ is an independently selected monovalent hydrocarbon group that is free of aliphatic unsaturation or a monovalent halogenated hydrocarbon group that is free of aliphatic unsaturation; each $R^6$ is independently selected from the group consisting of alkenyl and alkynyl; subscript aa is 0, 1, or 2, subscript bb is 0 or more, subscript cc is 1 or more, subscript dd is 0, 1, or 2, with the provisos that a quantity (aa+dd)≥2, and (aa+dd)=2, with the proviso that a quantity (aa+bb+cc+dd) is 3 to 2,000. Alternatively, subscript cc≥0. Alternatively, subscript bb≥2. Alternatively, the quantity (aa+dd) is 2 to 10, alternatively 2 to 8, and alternatively 2 to 6. Alternatively, subscript cc is 0 to 1,000, alternatively 1 to 500, and alternatively 1 to 200. Alternatively, subscript bb is 2 to 500, alternatively 2 to 200, and alternatively 2 to 100.

The monovalent hydrocarbon group for $R^5$ is exemplified by an alkyl group of 1 to 6 carbon atoms, an aryl group of 6 to 10 carbon atoms, a halogenated alkyl group of 1 to 6 carbon atoms, a halogenated aryl group of 6 to 10 carbon atoms, an aralkyl group of 7 to 12 carbon atoms or a halogenated aralkyl group of 7 to 12 carbon atoms, where alkyl, aryl, and halogenated alkyl are as described herein. Alternatively, each $R^5$ is an alkyl group. Alternatively, each $R^5$ is independently methyl, ethyl or propyl. Each instance of $R^5$ may be the same or different. Alternatively, each $R^5$ is a methyl group.

The aliphatically unsaturated monovalent hydrocarbon group for $R^6$ is capable of undergoing hydrosilylation reaction. Suitable aliphatically unsaturated hydrocarbon groups for $R^6$ are exemplified by an alkenyl group as defined herein and exemplified by vinyl, allyl, butenyl, and hexenyl; and alkynyl groups as defined herein and exemplified by ethynyl and propynyl. Alternatively, each $R^6$ may be vinyl or hexenyl. Alternatively, each $R^6$ is a vinyl group. The alkenyl or alkynyl content of the (B) organopolysiloxane may be 0.1% to 1%, alternatively 0.2% to 0.5%, based on the weight of the (B) organopolysiloxane.

When the (B) organopolysiloxane is substantially linear, alternatively is linear, the at least two aliphatically unsaturated groups may be bonded to silicon atoms in pendent positions, terminal positions, or in both pendent and terminal locations. As a specific example of the (B) organopolysiloxane having pendant silicon-bonded aliphatically unsaturated groups, the (B) organopolysiloxane may have the average unit formula: $[(CH_3)_3SiO_{1/2}]_2[(CH_3)_2SiO_{2/2}]_{cc}[(CH_3)ViSiO_{2/2}]_{bb}$, where subscripts bb and cc are defined above, and Vi indicates a vinyl group. With regard to this average formula, any methyl group may be replaced with a different monovalent hydrocarbon group (such as alkyl or aryl), and any vinyl group may be replaced with a different aliphatically unsaturated monovalent hydrocarbon group (such as allyl or hexenyl). Alternatively, as a specific example of the polyorganosiloxane having an average, per molecule, of at least two silicon-bonded aliphatically unsaturated groups, the (B) organopolysiloxane may have the average formula: $Vi(CH_3)_2SiO[(CH_3)_2SiO]_{cc}Si(CH_3)_2Vi$, where subscript cc and Vi are defined above. The dimethyl polysiloxane terminated with silicon-bonded vinyl groups may be used alone or in combination with the dimethyl, methyl-vinyl polysiloxane disclosed immediately above as the (B) organopolysiloxane. With regard to this average formula, any methyl group may be replaced with a different monovalent hydrocarbon group, and any vinyl group may be replaced with any terminally aliphatically unsaturated monovalent hydrocarbon group. Because the at least two silicon-bonded aliphatically unsaturated groups may be both pendent and terminal, the (B) organopolysiloxane may alternatively have the average unit formula: $[Vi(CH_3)_2SiO_{1/2}]_2[(CH_3)_2SiO_{2/2}]_{cc}[(CH_3)ViSiO_{2/2}]_{bb}$, where subscripts bb and cc and Vi are defined above.

When the (B) organopolysiloxane is the substantially linear polyorganosiloxane, the (B) organopolysiloxane can be exemplified by a dimethylpolysiloxane capped at both molecular terminals with dimethylvinylsiloxy groups, a methylphenylpolysiloxane capped at both molecular terminals with dimethylvinylsiloxy groups, a copolymer of a methylphenylsiloxane and dimethylsiloxane capped at both molecular terminals with dimethylvinylsiloxy groups, a copolymer of a methylvinylsiloxane and a methylphenylsiloxane capped at both molecular terminals with dimethylvinylsiloxy groups, a copolymer of a methylvinylsiloxane and diphenylsiloxane capped at both molecular terminals with dimethylvinylsiloxy groups, a copolymer of a methylvinylsiloxane, methylphenylsiloxane, and dimethylsiloxane capped at both molecular terminals with dimethylvinylsiloxy groups, a copolymer of a methylvinylsiloxane and a methylphenylsiloxane capped at both molecular terminals with trimethylsiloxy groups, a copolymer of a methylvinylsiloxane and diphenylsiloxane capped at both molecular terminals with trimethylsiloxy groups, and a copolymer of a methylvinylsiloxane, methylphenylsiloxane, and a dimethylsiloxane capped at both molecular terminals with trimethylsiloxy groups.

Alternatively, the (B) organopolysiloxane may comprise a substantially linear, alternatively linear, polyorganosiloxane selected from the group consisting of:
i) dimethylvinylsiloxy-terminated polydimethylsiloxane,
ii) dimethylvinylsiloxy-terminated poly(dimethylsiloxane/methylvinylsiloxane),
iii) dimethylvinylsiloxy-terminated polymethylvinylsiloxane,
iv) trimethylsiloxy-terminated poly(dimethylsiloxane/methylvinylsiloxane),
v) trimethylsiloxy-terminated polymethylvinylsiloxane,
vi) dimethylvinylsiloxy-terminated poly(dimethylsiloxane/methylvinylsiloxane),
vii) dimethylvinylsiloxy-terminated poly(dimethylsiloxane/methylphenylsiloxane),
viii) dimethylvinylsiloxy-terminated poly(dimethylsiloxane/diphenylsiloxane), ix) phenyl,methyl,vinyl-siloxy-terminated polydimethylsiloxane,
x) dimethylhexenylsiloxy-terminated polydimethylsiloxane,
xi) dimethylhexenylsiloxy-terminated poly(dimethylsiloxane/methylhexenylsiloxane),
xii) dimethylhexenylsiloxy-terminated polymethylhexenylsiloxane,
xiii) trimethylsiloxy-terminated poly(dimethylsiloxane/methylhexenylsiloxane),
xiv) trimethylsiloxy-terminated polymethylhexenylsiloxane
xv) dimethylhexenyl-siloxy terminated poly(dimethylsiloxane/methylhexenylsiloxane),
xvi) dimethylvinylsiloxy-terminated poly(dimethylsiloxane/methylhexenylsiloxane), and
xvii) a combination thereof.

Alternatively, the (B) organopolysiloxane may comprise a resinous polyorganosiloxane. The resinous polyorganosiloxane may have the average formula: $R^4{}_{a''}SiO_{(4-a'')/2}$, where each $R^4$ is independently selected as defined above, and where subscript a'' is selected such that $0.5 \geq a'' \geq 1.7$.

The resinous polyorganosiloxane has a branched or a three dimensional network molecular structure. At 25° C., the resinous polyorganosiloxane may be in a liquid or in a solid form. Alternatively, the resinous polyorganosiloxane may be exemplified by a polyorganosiloxane that comprises only T units, a polyorganosiloxane that comprises T units in combination with other siloxy units (e.g., M, D, and/or Q siloxy units), or a polyorganosiloxane comprising Q units in combination with other siloxy units (i.e., M, D, and/or T siloxy units). Typically, the resinous polyorganosiloxane comprises T and/or Q units. Specific example of the resinous polyorganosiloxane include a vinyl-terminated silsesquioxane (i.e., T resin) and a vinyl-terminated MDQ resin.

Alternatively, the (B) organopolysiloxane may comprise a branched siloxane, a silsesquioxane, or both a branched siloxane and a silsesquioxane.

When the (B) organopolysiloxane comprises a blend of different organopolysiloxanes, the blend may be a physical blend or mixture. For example, when the (B) organopolysiloxane comprises the branched siloxane and the silsesquioxane, the branched siloxane and the silsesquioxane are present in amounts relative to one another such that the amount of the branched siloxane and the amount of the silsesquioxane combined total 100 weight parts, based on combined weights of all components present in the composition. The branched siloxane may be present in an amount of 50 to 100 parts by weight, and the silsesquioxane may be present in an amount of 0 to 50 parts by weight. Alternatively, the branched siloxane may be present in an amount 50 to 90 parts by weight and the silsesquioxane may be present in an amount of 10 to 50 parts by weight. Alternatively, the branched siloxane may be present in an amount of 50 to 80 parts by weight and the silsesquioxane may be present in an amount of 20 to 50 parts by weight. Alternatively, the branched siloxane may be present in an amount of 50 to 76 parts by weight and the silsesquioxane may be present in an amount of 24 to 50 parts by weight. Alternatively, the branched siloxane may be present in an amount of 50 to 70 parts by weight and the silsesquioxane may be present in an amount of 30 to 50 parts by weight.

The branched siloxane of the (B) organopolysiloxane may have unit formula: $(R^7{}_3SiO_{1/2})_p(R^8R^7{}_2SiO_{1/2})_q(R^7{}_2SiO_{2/2})_r(SiO_{4/2})_s$, where each $R^7$ is independently a monovalent hydrocarbon group free of aliphatic unsaturation or a monovalent halogenated hydrocarbon group free of aliphatic unsaturation and each $R^8$ is an alkenyl group or an alkynyl group, both of which are as described above, subscript $p \geq 0$, subscript $q > 0$, $15 \geq r \geq 995$, and subscript s is $>0$.

In the unit formula immediately above, subscript $p \geq 0$. Subscript $q > 0$. Alternatively, subscript $q \geq 3$. Subscript r is from 15 to 995. Subscript s is $>0$. Alternatively, subscript $s \geq 1$. Alternatively, for subscript p: $22 \geq p \geq 0$; alternatively $20 \geq p \geq 0$; alternatively $15 \geq p \geq 0$; alternatively $10 \geq p \geq 0$; and alternatively $5 \geq p \geq 0$. Alternatively, for subscript q: $22 \geq q > 0$; alternatively $22 \geq q \geq 4$; alternatively $20 \geq q > 0$; alternatively $15 \geq q > 1$; alternatively $10 \geq q \geq 2$; and alternatively $15 \geq q \geq 4$. Alternatively, for subscript r: $800 \geq r \geq 15$; and alternatively $400 \geq r \geq 15$. Alternatively, for subscript s: $10 \geq s > 0$; alternatively, $10 \geq s \geq 1$; alternatively $5 \geq s > 0$; and alternatively $s=1$. Alternatively, subscript s is 1 or 2. Alternatively, when subscript s=1, subscript p may be 0 and subscript q may be 4.

The branched siloxane may contain at least two polydiorganosiloxane chains of formula $(R^7{}_2SiO_{2/2})_m$, where each subscript m is independently 2 to 100. Alternatively, the branched siloxane may comprise at least one unit of formula $(SiO_{4/2})$ bonded to four polydiorganosiloxane chains of formula $(R^7{}_2SiO_{2/2})_o$, where each subscript o is independently 1 to 100. Alternatively, the branched siloxane may have formula:

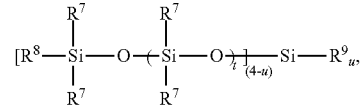

where subscript u is 0 or 1, each subscript t is independently 0 to 995, alternatively 15 to 995, and alternatively 0 to 100; each $R^9$ is an independently selected monovalent hydrocarbon group, each $R^7$ is an independently selected monovalent hydrocarbon group that is free of aliphatic unsaturation or a monovalent halogenated hydrocarbon group that is free of aliphatic unsaturation as described above, and each $R^8$ is independently selected from the group consisting of alkenyl and alkynyl as described above. Suitable branched siloxanes are exemplified by those disclosed in U.S. Pat. No. 6,806,339 and U.S. Patent Publication 2007/0289495.

The silsesquioxane may have unit formula: $(R^7{}_3SiO_{1/2})_i(R^8R^7{}_2SiO_{1/2})_f(R^7{}_2SiO_{2/2})_g(R^7SiO_{3/2})_h$, where $R^7$ and $R^8$ are as described above, subscript $i \geq 0$, subscript $f > 0$, subscript g is 15 to 995, and subscript $h > 0$. Subscript i may be 0 to 10. Alternatively, for subscript i: $12 \geq i \geq 0$; alternatively $10 \geq i \geq 0$; alternatively $7 \geq i \geq 0$; alternatively $5 \geq i \geq 0$; and alternatively $3 \geq i \geq 0$.

Alternatively, subscript $f \geq 1$. Alternatively, subscript $f \geq 3$. Alternatively, for subscript f: $12 \geq f > 0$; alternatively $12 \geq f \geq 3$; alternatively $10 \geq f > 0$; alternatively $7 \geq f > 1$; alternatively $5 \geq f \geq 2$; and alternatively $7 \geq f \geq 3$. Alternatively, for subscript g: $800 \geq g \geq 15$; and alternatively $400 \geq g \geq 15$. Alternatively, subscript $h \geq 1$. Alternatively, subscript h is 1 to 10. Alternatively, for subscript h: $10 \geq h > 0$; alternatively $5 \geq h > 0$; and alternatively $h=1$. Alternatively, subscript h is 1 to 10, alternatively subscript h is 1 or 2. Alternatively, when subscript h=1, then subscript f may be 3 and subscript i may be 0. The values for subscript f may be sufficient to provide the silsesquioxane of unit formula (ii-ll) with an alkenyl content of 0.1% to 1%, alternatively 0.2% to 0.6%, based on the weight of the silsesquioxane. Suitable silsesquioxanes are exemplified by those disclosed in U.S. Pat. No. 4,374,967.

The (B) organopolysiloxane may have the formula $(R^3_yR^1_{3-y}SiO_{1/2})_x(R^1_2SiO_{2/2})_z(SiO_{4/2})_{1.0}(ZO_{1/2})_w$, where each $R^3$ is an independently selected ethylenically unsaturated group, subscript y is independently selected in each siloxy unit indicated by subscript x; each $R^1$ is independently selected and defined above; subscript x' is from 1.5 to 4; Z is independently elected and defined above; subscript w is from 0 to 3; and subscript z' is from 3 to 1,000.

The (B) organopolysiloxane may comprise a combination or two or more different polyorganosiloxanes that differ in at least one property such as structure, molecular weight, monovalent groups bonded to silicon atoms and content of aliphatically unsaturated groups. The composition may comprise the (B) organopolysiloxane in an amount of from 60 to 99.5, alternatively from 60 to 98, alternatively from 60 to 95, alternatively from 70 to 95, alternatively from 75 to 95, weight percent based on the total weight of the composition.

When the composition consists essentially of, alternatively consists of, components (A) and (B), i.e., in the absence of any catalyst or cross-linker, the composition may be referred to as a base composition. The base composition is typically combined with other components to give a composition that is curable, generally via hydrosilylation, which can be cured to give a release coating. Said differently, the base composition is typically combined with other components to give a curable composition, which can be utilize to form release coatings or liners. The curable composition can be referred to as a release composition or a release coating composition.

In these or other embodiments, the base composition consisting of the (A) organopolysiloxane and the (B) organopolysiloxane has a viscosity at 25° C. such that the base composition is flowable. For example, in certain embodiments, depending on a selection of components (A) and (B), a 40:60 blend by weight of (A):(B) has a viscosity of from 500 to 100,000, alternatively from 2,000 to 50,000, alternatively from 4,000 to 30,000, centipoise (cP). Viscosity may be measured via a Brookfield LV DV-E viscometer with a spindle selected as appropriate to the viscosity of the base composition.

In these or other embodiments, the same base composition has a weight-average molecular weight of from 500 to 500,000, alternatively from 1,000 to 250,000, alternatively from 10,000 to 150,000. Molecular weight may be measured via gel permeation chromatography (GPC) relative to polystyrene standards.

In certain embodiments, the composition further comprises (C) an organosilicon compound having an average of at least two silicon-bonded hydrogen atoms per molecule. The (C) organosilicon compound may be linear, branched, partly branched, cyclic, resinous (i.e., have a three-dimensional network), or may comprise a combination of different structures. The (C) organosilicon compound is typically a cross-linker, and reacts with the ethylenically unsaturated groups of component (B), and, if present, those of component (A), when forming a coating, e.g. a release coating. Typically, the (C) organosilicon compound comprises an organohydrogensiloxane.

The (C) organosilicon compound may comprise any combination of M, D, T and/or Q siloxy units, so long as the (C) organosilicon compound includes at least two silicon-bonded hydrogen atoms per molecule. These siloxy units can be combined in various manners to form cyclic, linear, branched and/or resinous (three-dimensional networked) structures. The (C) organosilicon compound may be monomeric, polymeric, oligomeric, linear, branched, cyclic, and/or resinous depending on the selection of M, D, T, and/or Q units.

Because the (C) organosilicon compound includes an average of at least two silicon-bonded hydrogen atoms per molecule, with reference to the siloxy units set forth above, the ((C) organosilicon compound may comprise any of the following siloxy units including silicon-bonded hydrogen atoms, optionally in combination with siloxy units which do not include any silicon-bonded hydrogen atoms: $(R^1_2HSiO_{1/2})$, $(R^1H_2SiO_{1/2})$, $(H_3SiO_{1/2})$, $(R^1HSiO_{2/2})$, $(H_2SiO_{2/2})$, and/or $(HSiO_{3/2})$, where $R^1$ is independently selected and defined above.

In specific embodiments, the (C) organosilicon compound is a substantially linear, alternatively linear, polyorganohydrogensiloxane. The substantially linear or linear polyorganohydrogensiloxane has unit formula: $(HR^{10}_2SiO_{1/2})_{v'}(HR^{10}SiO_{2/2})_{w'}(R^{10}_2SiO_{2/2})_{x'}(R^{10}_3SiO_{1/2})_{y'}$, where each $R^{10}$ is independently selected monovalent hydrocarbon group, subscript v' is 0, 1, or 2, subscript w' is 1 or more, subscript x' is 0 or more, subscript y' is 0, 1, or 2, with the provisos that a quantity (v'+y')=2, and a quantity (v'+w')≥3. The monovalent hydrocarbon group for $R^{10}$ may be as described above for the monovalent hydrocarbon group for $R^1$. A quantity (v'+w'+x'+y') may be 2 to 1,000. The polyorganohydrogensiloxane is exemplified by:

i) dimethylhydrogensiloxy-terminated poly(dimethyl/methylhydrogen)siloxane copolymer,
ii) dimethylhydrogensiloxy-terminated polymethylhydrogensiloxane,
iii) trimethylsiloxy-terminated poly(dimethyl/methylhydrogen)siloxane copolymer,
iv) trimethylsiloxy-terminated polymethylhydrogensiloxane, and/or
v) a combination of two or more of i), ii), iii), iv), and v).
Suitable polyorganohydrogensiloxanes are commercially available from Dow Silicones Corporation of Midland, Michigan, USA.

In one specific embodiment, the (C) organosilicon compound is linear and includes pendent silicon-bonded hydrogen atoms. In these embodiments, the (C) organosilicon compound may be a dimethyl, methyl-hydrogen polysiloxane having the average formula;

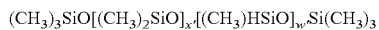

where x' and w' are defined above. One of skill in the art understands that in the exemplary formula above the dimethylsiloxy units and methylhydrogensiloxy units may be present in randomized or block form, and that any methyl group may be replaced with any other hydrocarbon group free of aliphatic unsaturation.

In another specific embodiment, the (C) organosilicon compound is linear and includes terminal silicon-bonded hydrogen atoms. In these embodiments, the (C) organosilicon compound may be an SiH terminal dimethyl polysiloxane having the average formula:

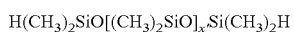

where x' is as defined above. The SiH terminal dimethyl polysiloxane may be utilized alone or in combination with the dimethyl, methyl-hydrogen polysiloxane disclosed immediately above. When a mixture is utilized, the relative amount of each organohydrogensiloxane in the mixture may vary. One of skill in the art understands that any methyl group in the exemplary formula above may be replaced with any other hydrocarbon group free of aliphatic unsaturation.

Alternatively still, the (C) organosilicon compound may include both pendent and terminal silicon-bonded hydrogen atoms.

In certain embodiments, the (C) organosilicon compound may comprise an alkylhydrogen cyclosiloxane or an alkylhydrogen dialkyl cyclosiloxane copolymer. Specific examples of suitable organohydrogensiloxanes of this type include $(OSiMeH)_4$, $(OSiMeH)_3(OSiMeC_6H_{13})$, $(OSiMeH)_2(OSiMeC_6H_{13})_2$, and $(OSiMeH)(OSiMeC_6H_{13})_3$, where Me represents methyl (—$CH_3$).

Other examples of suitable organohydrogensiloxanes for the (C) organosilicon compound are those having at least two SiH containing cyclosiloxane rings in one molecule. Such an organohydrogensiloxane may be any organopolysiloxane having at least two cyclosiloxane rings with at least one silicon-bonded hydrogen (SiH) atom on each siloxane ring. Cyclosiloxane rings contain at least three siloxy units (that is, the minimum needed in order to form a siloxane ring), and may be any combination of M, D, T, and/or Q siloxy units that forms a cyclic structure, provided that at least one of the cyclic siloxy units on each siloxane ring contains one SiH unit, which may be an M siloxy unit, a D siloxy unit, and/or a T siloxy unit. These siloxy units can be represented as MH, DH, and TH siloxy units respectively when other substituents are methyl.

The (C) organosilicon compound may comprise a combination or two or more different organohydrogensiloxanes that differ in at least one property such as structure, molecular weight, monovalent groups bonded to silicon atoms and content of silicon-bonded hydrogen atoms. The composition may comprise the (C) organosilicon compound in an amount to give a molar ratio of silicon-bonded hydrogen atoms in component (C) to silicon-bonded ethylenically unsaturated groups in component (B) (and those of component (A), if present), in an amount of from 1:1 to 5:1, alternatively from 1.1:1 to 3.1.

In certain embodiments, the composition further comprises (D) a hydrosilylation-reaction catalyst. The (D) hydrosilylation-reaction catalyst is not limited and may be any known hydrosilylation-reaction catalyst for catalyzing hydrosilylation reactions. Combinations of different hydrosilylation-reaction catalysts may be utilized.

In certain embodiments, the (D) hydrosilylation-reaction catalyst comprises a Group VIII to Group XI transition metal. Group VIII to Group XI transition metals refer to the modern IUPAC nomenclature. Group VIII transition metals are iron (Fe), ruthenium (Ru), osmium (Os), and hassium (Hs); Group IX transition metals are cobalt (Co), rhodium (Rh), and iridium (Ir); Group X transition metals are nickel (Ni), palladium (Pd), and platinum (Pt); and Group XI transition metals are copper (Cu), silver (Ag), and gold (Au). Combinations thereof, complexes thereof (e.g. organometallic complexes), and other forms of such metals may be utilized as the (D) hydrosilylation-reaction catalyst.

Additional examples of catalysts suitable for the (D) hydrosilylation-reaction catalyst include rhenium (Re), molybdenum (Mo), Group IV transition metals (i.e., titanium (Ti), zirconium (Zr), and/or hafnium (Hf)), lanthanides, actinides, and Group I and II metal complexes (e.g. those comprising calcium (Ca), potassium (K), strontium (Sr), etc.). Combinations thereof, complexes thereof (e.g. organometallic complexes), and other forms of such metals may be utilized as the (D) hydrosilylation-reaction catalyst.

The (D) hydrosilylation-reaction catalyst may be in any suitable form. For example, the (D) hydrosilylation-reaction catalyst may be a solid, examples of which include platinum-based catalysts, palladium-based catalysts, and similar noble metal-based catalysts, and also nickel-based catalysts. Specific examples thereof include nickel, palladium, platinum, rhodium, cobalt, and similar elements, and also platinum-palladium, nickel-copper-chromium, nickel-copper-zinc, nickel-tungsten, nickel-molybdenum, and similar catalysts comprising combinations of a plurality of metals. Additional examples of solid catalysts include Cu—Cr, Cu—Zn, Cu—Si, Cu—Fe—Al, Cu—Zn—Ti, and similar copper-containing catalysts, and the like.

The (D) hydrosilylation-reaction catalyst may be in or on a solid carrier. Examples of carriers include activated carbons, silicas, silica aluminas, aluminas, zeolites and other inorganic powders/particles (e.g. sodium sulphate), and the like. The (D) hydrosilylation-reaction catalyst may also be disposed in a vehicle, e.g. a solvent which solubilizes the (D) hydrosilylation-reaction catalyst, alternatively a vehicle which merely carries, but does not solubilize, the (D) hydrosilylation-reaction catalyst. Such vehicles are known in the art.

In specific embodiments, the (D) hydrosilylation-reaction catalyst comprises platinum. In these embodiments, the (D) hydrosilylation-reaction catalyst is exemplified by, for example, platinum black, compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum chloride, and complexes of such compounds with olefins or organopolysiloxanes, as well as platinum compounds microencapsulated in a matrix or core-shell type compounds. Microencapsulated hydrosilylation catalysts and methods of their preparation are also known in the art, as exemplified in U.S. Pat. Nos. 4,766,176 and 5,017,654, which are incorporated by reference herein in their entireties.

Complexes of platinum with organopolysiloxanes suitable for use as the (D) hydrosilylation-reaction catalyst include 1,3-diethenyl-1,1,3,3-tetramethyldisiloxane complexes with platinum. These complexes may be microencapsulated in a resin matrix. Alternatively, the (D) hydrosilylation-reaction catalyst may comprise 1,3-diethenyl-1,1,3,3-tetramethyldisiloxane complex with platinum. The (D) hydrosilylation-reaction catalyst may be prepared by a method comprising reacting chloroplatinic acid with an aliphatically unsaturated organosilicon compound such as divinyltetramethyldisiloxane, or alkene-platinum-silyl complexes.

The (D) hydrosilylation-reaction catalyst may also, or alternatively, be a photoactivatable hydrosilylation-reaction catalyst, which may initiate curing via irradiation and/or heat. The photoactivatable hydrosilylation-reaction catalyst can be any hydrosilylation-reaction catalyst capable of catalyzing the hydrosilylation reaction, particularly upon exposure to radiation having a wavelength of from 150 to 800 nanometers (nm).

Specific examples of photoactivatable hydrosilylation-reaction catalysts suitable for the (D) hydrosilylation-reaction catalyst include, but are not limited to, platinum(II) β-diketonate complexes such as platinum(II) bis(2,4-pentanedioate), platinum(II) bis(2,4-hexanedioate), platinum (II) bis(2,4-heptanedioate), platinum(II) bis(1-phenyl-1,3-butanedioate, platinum(II) bis(1,3-diphenyl-1,3-propanedioate), platinum(II) bis(1,1,1,5,5,5-hexafluoro-2,4-pentanedioate); (η-cyclopentadienyl)trialkylplatinum complexes, such as (Cp)trimethylplatinum, (Cp)ethyldimethylplatinum, (Cp)triethylplatinum, (chloro-Cp)trimethylplatinum, and (trimethylsilyl-Cp)trimethylplatinum, where Cp represents cyclopentadienyl; triazene oxide-transition metal complexes, such as Pt[C$_6$H$_5$NNNOCH$_3$]$_4$, Pt[p-CN—C$_6$H$_4$NNNOC$_6$H$_{11}$]$_4$, Pt[p-H$_3$COC$_6$H$_4$NNNOC$_6$H$_{11}$]$_4$, Pt[p-CH$_3$(CH$_2$)$_x$—C$_6$H$_4$NNNOCH$_3$]$_4$, 1,5-cyclooctadiene.Pt[p-CN—C$_6$H$_4$NNNOC$_6$H$_{11}$]$_2$, 1,5-cyclooctadiene.Pt[p-CH$_3$O—C$_6$H$_4$NNNOCH$_3$]$_2$, [(C$_6$H$_5$)$_3$P]$_3$Rh[p-CN—C$_6$H$_4$NNNOC$_6$H$_{11}$], and Pd[p-CH$_3$(CH$_2$)$_x$—C$_6$H$_4$NNNOCH$_3$]$_2$, where x is 1, 3, 5, 11, or 17; (η-diolefin)(σ-aryl)platinum complexes, such as (η$^4$-1,5-cyclooctadienyl)diphenylplatinum, η$^4$-1,3,5,7-cyclooctatetraenyl)diphenylplatinum, (η$^4$-2,5-norboradienyl)diphenylplatinum, (η$^4$-1,5-cyclooctadienyl)bis-(4-dimethylaminophenyl)platinum, (η$^4$-1,5-cyclooctadienyl)bis-(4-acetylphenyl)platinum, and (η$^4$-1,5-cyclooctadienyl)bis-(4-trifluormethylphenyl)platinum. Typically, the photoactivatable hydrosilylation-reaction catalyst is a Pt(11) β-diketonate complex and more typically the catalyst is platinum(II) bis(2,4-pentanedioate).

The (D) hydrosilylation-reaction catalyst is present in the composition in a catalytic amount, i.e., an amount or quantity sufficient to promote curing thereof at desired conditions. The hydrosilylation-reaction catalyst can be a single hydrosilylation-reaction catalyst or a mixture comprising two or more different hydrosilylation-reaction catalysts.

The catalytic amount of the (D) hydrosilylation-reaction catalyst may be >0.01 ppm to 10,000 ppm; alternatively >1,000 ppm to 5,000 ppm. Alternatively, the typical catalytic amount of the (D) hydrosilylation-reaction catalyst is 0.1 ppm to 5,000 ppm, alternatively 1 ppm to 2,000 ppm, alternatively >0 to 1,000 ppm. Alternatively, the catalytic amount of (D) hydrosilylation-reaction catalyst may be 0.01 ppm to 1,000 ppm, alternatively 0.01 ppm to 100 ppm, alternatively 20 ppm to 200 ppm, and alternatively 0.01 ppm to 50 ppm of platinum group metal; based on the total weight of composition.

The composition may further comprise one or more of: (E) an inhibitor, (F) an anchorage additive, (G) an anti-mist additive, (H) a release modifier, and (I) a vehicle.

In certain embodiments, the composition further comprises the (E) inhibitor. The (E) inhibitor may be used for altering the reaction rate or curing rate of the composition, as compared to a composition containing the same starting materials but with the (E) inhibitor omitted. The (E) inhibitor is exemplified by acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, and 1-ethynyl-1-cyclohexanol, and a combination thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne; triazoles such as benzotriazole; phosphines; mercaptans; hydrazines; amines, such as tetramethyl ethylenediamine, dialkyl fumarates, dialkenyl fumarates, dialkoxyalkyl fumarates, maleates such as diallyl maleate; nitriles; ethers; carbon monoxide; alkenes such as cyclooctadiene, divinyltetramethyldisiloxane; alcohols such as benzyl alcohol; and a combination thereof. Alternatively, the (E) inhibitor may be selected from the group consisting of acetylenic alcohols (e.g., 1-ethynyl-1-cyclohexanol) and maleates (e.g., diallyl maleate, bis maleate, or n-propyl maleate) and a combination of two or more thereof.

Alternatively, the (E) inhibitor may be a silylated acetylenic compound. Without wishing to be bound by theory, it is thought that adding a silylated acetylenic compound reduces yellowing of the reaction product prepared from hydrosilylation reaction of the composition as compared to a reaction product from hydrosilylation of a composition that does not contain a silylated acetylenic compound or that contains an organic acetylenic alcohol inhibitor, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, the (E) inhibitor is exemplified by methyl(tris(1,1-dimethyl-2-propynyloxy))silane, ((1,1-dimethyl-2-propynyl)oxy)trimethylsilane, or a combination thereof. The silylated acetylenic compound useful as the (E) inhibitor may be prepared by methods known in the art, such as silylating an acetylenic alcohol described above by reacting it with a chlorosilane in the presence of an acid receptor.

The amount of the (E) inhibitor present in the composition will depend on various factors including the desired pot life of the composition, whether the composition will be a one part composition or a multiple part composition, the particular inhibitor used, and the selection and amount of components (A)-(D). However, when present, the amount of the (E) inhibitor may be 0% to 1%, alternatively 0% to 5%, alternatively 0.001% to 1%, alternatively 0.01% to 0.5%, and alternatively 0.0025% to 0.025%, based on the total weight of the composition.

In certain embodiments, the composition further comprises the (F) anchorage additive. Suitable anchorage additives are exemplified by a reaction product of a vinyl alkoxysilane and an epoxy-functional alkoxysilane; a reaction product of a vinyl acetoxysilane and epoxy-functional alkoxysilane; and a combination (e.g., physical blend and/or a reaction product) of a polyorganosiloxane having at least one aliphatically unsaturated hydrocarbon group and at least one hydrolyzable group per molecule and an epoxy-functional alkoxysilane (e.g., a combination of a hydroxy-terminated, vinyl functional polydimethylsiloxane with glycidoxypropyltrimethoxysilane). Alternatively, the anchorage additive may comprise a polyorganosilicate resin. Suitable anchorage additives and methods for their preparation are disclosed, for example, in U.S. Pat. No. 9,562,149; U.S. Patent Application Publication Numbers 2003/0088042, 2004/0254274, and 2005/0038188; and European Patent 0 556 023.

Further examples of suitable anchorage additives include a transition metal chelate, a hydrocarbonoxysilane such as an alkoxysilane, a combination of an alkoxysilane and a hydroxy-functional polyorganosiloxane, or a combination thereof. The (F) anchorage additive may be a silane having at least one substituent having an adhesion-promoting group, such as an epoxy, acetoxy or acrylate group. The adhesion-promoting group may additionally or alternatively be any hydrolysable group which does not impact the (D) hydrosilylation-reaction catalyst. Alternatively, the (F) anchorage additive may comprise a partial condensate of such a silane, e.g. an organopolysiloxane having an adhesion-promoting group. Alternatively still, the (F) anchorage additive may comprise a combination of an alkoxysilane and a hydroxy-functional polyorganosiloxane.

Alternatively, the (F) anchorage additive may comprise an unsaturated or epoxy-functional compound. The (F) anchorage additive may comprise an unsaturated or epoxy-functional alkoxysilane. For example, the functional alkoxysilane can include at least one unsaturated organic group or an epoxy-functional organic group. Epoxy-functional organic groups are exemplified by 3-glycidoxypropyl and (epoxycyclohexyl)ethyl. Unsaturated organic groups are exemplified by 3-methacryloyloxypropyl, 3-acryloyloxypropyl, and unsaturated monovalent hydrocarbon groups such as vinyl, allyl, hexenyl, undecylenyl. One specific example of an unsaturated compound is vinyltriacetoxysilane.

Specific examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

The (F) anchorage additive may also comprise the reaction product or partial reaction product of one or more of these compounds. For example, in a specific embodiment, the (F) anchorage additive may comprise the reaction product or partial reaction product of vinyltriacetoxysilane and 3-glycidoxypropyltrimethoxysilane. Alternatively or in addition, the (F) anchorage additive may comprise alkoxy or alkenyl functional siloxanes.

Alternatively, the (F) anchorage additive may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. The (F) anchorage additive may comprise a combination of an epoxy-functional alkoxysilane and an epoxy-functional siloxane. For example, the (F) anchorage additive is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

Alternatively, the (F) anchorage additive may comprise a transition metal chelate. Suitable transition metal chelates include titanates, zirconates such as zirconium acetylacetonate, aluminum chelates such as aluminum acetylacetonate, and combinations thereof. Alternatively, the (F) anchorage additive may comprise a combination of a transition metal chelate with an alkoxysilane, such as a combination of glycidoxypropyltrimethoxysilane with an aluminum chelate or a zirconium chelate.

The particular amount of the (F) anchorage additive present in the composition, if utilized, depends on various factors including the type of substrate and whether a primer is used. In certain embodiments, the (F) anchorage additive is present in the composition in an amount of from 0 to 2 parts by weight, per 100 parts by weight of component (B). Alternatively, the (F) anchorage additive is present in the composition in an amount of from 0.01 to 2 parts by weight, per 100 parts by weight of component (B).

In certain embodiments, the composition further comprises the (G) anti-mist additive. The (G) anti-mist additive is distinguished from component (A), which also serves as an anti-mist additive when the composition is utilized to prepare a release coating. The (G) anti-mist additive may be utilized in the composition to reduce or suppress silicone mist formation in coating processes, particularly with high speed coating equipment. The (G) anti-mist additive may be a reaction product of an organohydrogensilicon compound, an oxyalkylene compound or an organoalkenylsiloxane with at least three silicon bonded alkenyl groups per molecule, and a suitable catalyst. Suitable anti-mist additives are disclosed, for example, in U.S. Patent Application 2011/0287267; U.S. Pat. Nos. 8,722,153; 6,586,535; and 5,625,023.

The amount of the (G) anti-mist additive utilized in the composition will depend on various factors including the amount and type of other starting materials selected for the composition. However, the (G) anti-mist additive is typically utilized in an amount of from 0% to 10%, alternatively 0.1% to 3%, based on the total weight of the composition. This amount excludes that associated with component (A), and only relates to the (G) anti-mist additive that is separate and distinct from component (A).

In certain embodiments, the composition further comprises the (H) release modifier, which may be utilized in the composition to control (decrease) the level of release force (the adhesive force between the release coating formed from the composition and an adherend thereto, such as a label including a pressure sensitive adhesive). Release coatings having the required or desired release force can be formulated from a modifier-free composition by adjusting the level or concentration of the (H) release modifier. Examples of suitable release modifiers for component (H) include trimethylsiloxy-terminated dimethyl, phenylmethylsiloxanes. Alternatively, the (H) release modifier may be a condensation reaction product of an organopolysiloxane resin having hydroxyl or alkoxy groups and a diorganopolysiloxane with at least one hydroxyl or hydrolyzable group. Examples of suitable release modifiers are disclosed, for example, in U.S. Pat. No. 8,933,177 and U.S. Patent Application Publication 2016/0053056. When utilized, the (H) release modifier can be present in the composition in an amount of from 0 to 85 parts by weight, alternatively 25 to 85 parts, per 100 parts of component (B).

In certain embodiments, the composition further comprises the (I) vehicle. The (I) vehicle typically solubilizes the components of the composition and, if the components solubilize, the (I) vehicle may be referred to as a solvent. Suitable vehicles include silicones, both linear and cyclic, organic oils, organic solvents and mixtures of these.

Typically, the (I) vehicle, if present in the composition, is an organic liquid. Organic liquids includes those considered oils or solvents. The organic liquids are exemplified by, but not limited to, aromatic hydrocarbons, aliphatic hydrocarbons, alcohols having more than 3 carbon atoms, aldehydes, ketones, amines, esters, ethers, glycols, glycol ethers, alkyl halides and aromatic halides. Hydrocarbons include isododecane, isohexadecane, Isopar L (C11-C13), Isopar H(C11-C12), hydrogenated polydecene, aromatic hydrocarbons, and halogenated hydrocarbons. Ethers and esters include isodecyl neopentanoate, neopentylglycol heptanoate, glycol distearate, dicaprylyl carbonate, diethylhexyl carbonate, propylene glycol n-butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, octyl ether, and octyl palmitate. Additional organic fluids suitable as a stand-alone compound or as an ingredient to the (I) vehicle include fats, oils, fatty acids, and fatty alcohols. The (I) vehicle may also be a low viscosity organopolysiloxane or a volatile methyl siloxane or a volatile ethyl siloxane or a volatile methyl ethyl siloxane having a viscosity at 25° C. in the range of 1 to 1,000 mm$^2$/sec, such as hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, and any mixtures thereof.

In specific embodiments, the (I) vehicle is selected from polyalkylsiloxanes; tetrahydrofuran; mineral spirits; naphtha; an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether; or a combination thereof. In one embodiment, when the composition is in the form of an emulsion, the (I) vehicle can comprise, alternatively consist of, an aqueous medium, or water.

The amount of the (I) vehicle will depend on various factors including the type of vehicle selected and the amount and type of other components present in the composition. However, the amount of the (I) vehicle in the composition may be from 0% to 99%, alternatively 2% to 50%, based on the total weight of the composition. The (I) vehicle may be added during preparation of the composition, for example, to aid mixing and delivery. All or a portion of the (I) vehicle may optionally be removed after the composition is prepared, including prior to and/or contemporaneous with preparing the release coating from the composition.

Other optional components may be present in the composition, including, for example, reactive diluents, fragrances, preservatives, colorants, dyes, pigments, anti-oxidants, heat stabilizers, flame retardants, flow control additives, biocides, fillers (including extending and reinforcing fillers), surfactants, thixotroping agents, pH buffers, etc. The composition may be in any form and may be incorporated into further compositions. For example, the composition may be in the form of, or incorporated into, an emulsion. The emulsion may be an oil-in-water emulsion, water-in-oil emulsion, silicone-in-oil emulsion, etc. The composition itself may be a continuous or discontinuous phase of such an emulsion.

Alternatively, the composition and release coating formed therefrom may be free of particulates or contains only a limited amount of particulate (e.g., filler and/or pigment), such as 0 to 30% by weight of the composition. Particulates can agglomerate or otherwise stick to the coater equipment used to form the release coating. In addition, particulates can hinder optical properties, for example transparency, of the release coating and of the release liner formed therewith, if optical transparency is desired. The particulates may be prejudicial to the adherence of an adherend.

In certain embodiments, the composition is free from fluoroorganosilicone compounds. It is believed that, during the cure, a fluorocompound, because of its low surface tension, may rapidly migrate to the interface of the composition or the release coating formed therewith and a substrate on which the composition is applied and the release coating is formed, for example a composition/PET film interface. Such migration may prevent adherence of the release coating (prepared by curing the composition) to the substrate by making a fluorine containing barrier. By making a barrier, the fluoroorganosilicone compounds may prevent any component of the composition from reacting at the interface, impacting curing and related properties. Moreover, fluoroorganosilicone compounds are usually expensive.

The composition in its curable form may be prepared by combining components (A)-(D), as well as any optional components, described above, in any order of addition, optionally with a master batch, and optionally under shear. As described in greater detail below, the composition may be a one part composition, a two component or 2K composition, or a multi-part composition. For example, components (A) and (B) may be a single part of the composition. When the composition is utilized to prepare the release coating or coated substrate, as described below, components (A) and (B) are combined with components (C) and (D), as well as any optional components, such that the composition is a curable composition. When the composition further comprises components (C) and (D), the composition may be referred to as the curable composition. Any description herein relating to optional components, certain embodiments, or certain method steps below apply equally to the composition and the curable composition.

In various embodiments, the composition may be prepared as an emulsion, e.g. an oil-in-water or water-in-oil emulsion depending on the selection of the continuous and discontinuous phase thereof. In these embodiments, the (I) vehicle is present in the composition as an aqueous medium, or water. The oil phase of the emulsion comprises the silicone components of the composition, i.e., at least components (A) and (B), as well as component (C), when present. In certain embodiments, the oil phase may further comprise an organic oil or a silicone oil to carry at least components (A) and (B), as well as component (C), when present. However, the organic oil or silicone oil is not required to prepare the emulsion. In addition, the emulsion can be a multi-part emulsion comprising different emulsions having different components, which multi-parts of the emulsion are combined and mixed in connection with curing. The emulsion can comprise any of the optional components described above in any part.

When utilized, the organic oil is typically a non-reactive or inert, i.e., the organic oil does not participate in any reaction in connection with curing the reactive components of the composition. Typically, the silicone components (e.g. components (A), (B), and (C), when present) are dispersed in the oil phase rather than the aqueous phase of the emulsion.

In certain embodiments, suitable organic oils include those which dissolve at least components (A) and (B), which typically forms a clear solution, and those which can be combined with at least components (A) and (B) to form a homogeneous dispersion without phase separation prior to, during, and/or after the formation of the emulsion. The organic oil may be, for example, any one or combination of the following: hydrocarbon oils, such as mineral oil fractions comprising linear (e.g., n-paraffinic) mineral oils, branched (iso-paraffinic) mineral oils, and/or cyclic (sometimes referred to as naphthenic) mineral oils, the hydrocarbons in the oil fractions comprising from 5 to 25 carbon atoms per molecule, or a liquid linear or branched paraffin containing 12 to 40 carbon atoms; polyisobutylenes (PIB); phosphate esters, such as trioctyl phosphate; polyalkylbenzenes; linear and/or branched alkylbenzenes, such as heavy alkylates, dodecyl benzene and other alkylarenes; esters of aliphatic monocarboxylic acids; linear or branched mono unsaturated hydrocarbons, such as linear or branched alkenes or mixtures thereof containing from 8 to 25 carbon atoms; and natural oils and derivatives thereof.

In one embodiment, the organic oil may include mineral oil fractions, natural oils, alkylcycloaliphatic compounds, alkybenzenes including polyalkylbenzenes, or combinations thereof.

Alkylbenzene compounds suitable for use as the organic oil include, for example, heavy alkylate alkylbenzenes and alkylcycloaliphatic compounds. Heavy alkylate alkylbenzenes include, for example, alkyl substituted aryl compounds which have aryl groups, such as benzene substituted by alkyl and/or other substituents. Additional examples include the extenders described in U.S. Pat. No. 4,312,801, which is incorporated by reference in its entirety.

Any suitable mixture of mineral oil fractions or mineral oil fractions in combination with any other organic oils may be used as the organic oil. Additional examples of organic oils include alkylcyclohexanes and paraffinic hydrocarbons (which may be linear, branched, or cyclic). The cyclic paraffinic hydrocarbons may be monocyclic and/or polycyclic hydrocarbons (naphthenics).

In another embodiment, the organic oil may comprise a natural oil. Natural oils are oils that are not derived from petroleum. More specifically, natural oils are derived from animals and/or vegetative matter (including seeds and nuts). Common natural oils include triglycerides of mixtures of fatty acids, particularly mixtures containing some unsaturated fatty acid. Alternatively, the organic oil may be a derivative of a natural oil such as a transesterified vegetable oil, a boiled natural oil, a blown natural oil, or a stand oil (e.g. a thermally polymerized oil). The natural oil may be derived from a variety of sources and may comprise, for example, wheatgerm, sunflower, grapeseed, castor, shea, avocado, olive, soybean, sweet almond, palm, rapeseed, cotton seed, hazelnut, macadamia, jojoba, blackcurrant, evening primrose, and combinations thereof.

Alternatively to the liquids exemplified above, the organic oil may be a solid, such as a wax. When the organic oil comprises a wax, the wax typically has a melting point of from 30 to 100° C. The wax may be, for example, a hydrocarbon wax, such as a petroleum-derived wax; a wax comprising carboxylic esters, such as beeswax, lanolin, tallow, carnauba, candelilla, tribehenin; or a wax derived from plant seeds, fruits, nuts or kernel, including softer waxes referred to as 'butter,' such as mango butter, shea butter or cocoa butter. The wax may alternatively be a polyether wax or a silicone wax.

Notably, when the organic oil comprises a mineral oil, the organic oil and at least components (A) and (B) are typically miscible, i.e., form a homogenous mixture. In contrast, when the organic oil comprises a natural oil, the organic oil and at least components (A) and (B) are commonly immiscible, i.e., form a heterogeneous mixture.

The mixture formed by combining component (A), (B), and optionally components (C) and/or (D) and, if utilized, the organic and/or silicone oil, may be heterogeneous or homogenous. The organic oil may solubilize, alternatively partially solubilize, at least components (A) and (B), optionally also components (C) and (D) if present. The organic oil may be referred to as a carrier or a solvent depending on whether components (A) and (B) solubilize or dissolve in the organic oil. The mixture can be formed in any manner, including any order of addition, with optional mixing or stirring.

The method further comprises combining the mixture, an aqueous medium and a surfactant to form the emulsion. The mixture is typically a discontinuous phase in the aqueous medium of the emulsion. The emulsion may be formed via the application of shear, e.g. by mixing, shaking, stirring, etc. The discontinuous phase of the emulsion is generally present as particles in the aqueous medium. The particles are liquid and may have generally spherical or other shapes, and may have varying sizes based on the components selected and their relative amounts.

The discontinuous phase of the emulsion is generally present as particles in the aqueous medium. The particles are liquid and may have generally spherical or other shapes, and may have varying sizes based on the components selected and their relative amounts. Particle size may be determined via laser diffraction particle size analysis (i.e., laser light scattering), e.g. using a Mastersizer 3000 particle size analyzer available from Malvern Panalytical Ltd of Malvern, UK, to determine particle sizes and distribution curves of the emulsion particles. As will be understood by those of skill in the art, a reported volume median diameter (VMD or "$Dv(0.5)$") represents a midpoint diameter (in pm), i.e., where 50% of the particles have a diameter larger, and 50% of the particles have a diameter smaller, than the median value. Similarly, a reported $Dv(0.9)$ represents the diameter below which falls 90% of the volume distribution of particles, and a reported $Dv(0.1)$ represents the diameter below which falls 10% of the volume distribution of particles. In some embodiments, the release coating composition is prepared as the emulsion comprising a $Dv(0.5)$ less than 1.5 μm, such as from 0.3 to 1.0 μm, alternatively from 0.4 to 0.9 μm. In these or other embodiments, the emulsion comprises a $Dv(0.9)$ less than 3.0 μm, such as from 0.5 to 2.5 μm, alternatively from 1.2 to 2.0 μm. In these or other embodiments, the emulsion comprises a $Dv(0.1)$ less than 0.9 μm, such as from 0.1 to 0.7 μm, alternatively from 0.2 to 0.5 μm. Particle sizes and distributions outside the preceding ranges may also be utilized, and will typically be selected by one of skill in the art, e.g. in view of the desired property of the release coating composition (e.g. such as viscosity, transparency, translucency, etc.).

The aqueous medium comprises water. The water may be from any source and may optionally be purified, e.g. via distillation, reverse osmosis, etc. The aqueous medium may further comprise one or more additional components other than water, as described below.

The surfactant may be any surfactant capable of emulsifying the various components or improving stability of the emulsion. For example, the surfactant may comprise one or more anionic, cationic, nonionic, and/or amphoteric surfactants, organomodified silicones such as dimethicone copolyol, oxyethylenated and/or oxypropylenated ethers of glycerol, oxyethylenated and/or oxypropylenated ethers of fatty alcohols such as ceteareth-30, C12-15 pareth-7, fatty acid esters of polyethylene glycol such as PEG-50 stearate, PEG-40 monostearate, saccharide esters and ethers such as sucrose stearate, sucrose cocoate and sorbitan stearate, and mixtures thereof, phosphoric esters and salts thereof such as DEA oleth-10 phosphate, sulphosuccinates such as disodium PEG-5 citrate lauryl sulphosuccinate and disodium ricinoleamido MEA sulphosuccinate, alkyl ether sulphates such as sodium lauryl ether sulphate, isethionates, betaine derivatives, and mixtures thereof.

In certain embodiments, the surfactant comprises the anionic surfactant. Anionic surfactants include, for example, carboxylates (sodium 2-(2-hydroxyalkyloxy)acetate)), amino acid derivatives (N-acylglutamates, N-acylglycinates or acylsarcosinates), alkyl sulfates, alkyl ether sulfates and oxyethylenated derivatives thereof, sulfonates, isethionates and N-acylisethionates, taurates and N-acyl N-methyltaurates, sulfosuccinates, alkylsulfoacetates, phosphates and alkyl phosphates, polypeptides, anionic derivatives of alkyl polyglycoside (acyl-D-galactoside uronate), and fatty acid soaps, alkali metal sulforicinates, sulfonated glyceryl esters of fatty acids such as sulfonated monoglycerides of coconut oil acids, salts of sulfonated monovalent alcohol esters such as sodium oleylisethianate, amides of amino sulfonic acids such as the sodium salt of oleyl methyl tauride, sulfonated products of fatty acids nitriles such as palmitonitrile sulfonate, sulfonated aromatic hydrocarbons such as sodium alpha-naphthalene monosulfonate, condensation products of naphthalene sulfonic acids with formaldehyde, sodium octahydroanthracene sulfonate, alkali metal alkyl sulfates such as sodium lauryl sulfate, ammonium lauryl sulfate and triethanol amine lauryl sulfate, ether sulfates having alkyl groups of 8 or more carbon atoms such as sodium lauryl ether sulfate, ammonium lauryl ether sulfate, sodium alkyl aryl ether sulfates, and ammonium alkyl aryl ether sulfates, alkylarylsulfonates having 1 or more alkyl groups of 8 or more carbon atoms, alkylbenzenesulfonic acid alkali metal salts exemplified by hexylbenzenesulfonic acid sodium salt, octylbenzenesulfonic acid sodium salt, decylbenzenesulfonic acid sodium salt, dodecylbenzenesulfonic acid sodium salt, cetylbenzenesulfonic acid sodium salt, and myristylbenzenesulfonic acid sodium salt, sulfuric esters of polyoxyethylene alkyl ether including $CH_3(CH_2)_6CH_2O(C_2H_4O)_2SO_3H$, $CH_3(CH_2)_7CH_2O(C_2H_4O)_{3.5}SO_3H$, $CH_3(CH_2)_8CH_2O(C_2H_4O)_8SO_3H$, $CH_3(CH_2)_{19}CH_2O(C_2H_4O)_4SO_3H$, and $CH_3(CH_2)_{10}CH_2O(C_2H_4O)_6SO_3H$, sodium salts, potassium salts, and amine salts of alkylnaphthylsulfonic acid, and mixtures thereof.

In these or other embodiments, the surfactant comprises the cationic surfactant. Cationic surfactants include, for example, various fatty acid amines and amides and their derivatives, and the salts of the fatty acid amines and amides. Examples of aliphatic fatty acid amines include dodecylamine acetate, octadecylamine acetate, and acetates of the amines of tallow fatty acids, homologues of aromatic amines having fatty acids such as dodecylanalin, fatty amides derived from aliphatic diamines such as undecylimidazoline, fatty amides derived from aliphatic diamines such asundecylimidazoline, fatty amides derived from disubstituted amines such as oleylaminodiethylamine, derivatives of ethylene diamine, quaternary ammonium compounds and their salts which are exemplified by tallow trimethyl ammonium chloride, dioctadecyldimethyl ammonium chloride, didodecyldimethyl ammonium chloride, dihexadecyl ammonium chloride, alkyltrimethylammonium hydroxides such as octyltrimethylammonium hydroxide, dodecyltrimethylammonium hydroxide, and hexadecyltrimethylammonium hydroxide, dialkyldimethylammonium hydroxides such as octyldimethylammonium hydroxide, decyldimethylammonium hydroxide, didodecyldimethylammonium hydroxide, dioctadecyldimethylammonium hydroxide, tallow trimethylammonium hydroxide, coconut oil, trimethylammonium hydroxide, methylpolyoxyethylene cocoammonium chloride, and dipalmitylhydroxyethylammonium methosulfate, amide derivatives of amino alcohols such as beta-hydroxylethylstearylamide, amine salts of long chain fatty acids, and mixtures thereof.

In these or other embodiments, the surfactant comprises the nonionic surfactant. Nonionic surfactants include, for example, polyoxyethylene alkyl ethers (such as lauryl, isotridecyl, branched decyl, cetyl, stearyl or octyl), polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene glycol modified polysiloxane surfactants, polyoxyalkylene-substituted silicones (rake or ABn types), silicone alkanolamides, silicone esters, silicone glycosides, dimethicone copolyols, fatty acid esters of polyols, for instance sorbitol and glyceryl mono-, di-, tri- and sesqui-oleates and stearates, glyceryl and polyethylene glycol laurates; fatty acid esters of polyethylene glycol (such as polyethylene glycol monostearates and monolaurates), polyoxyethylenated fatty acid esters (such as stearates and oleates) of sorbitol, and mixtures thereof.

In these or other embodiments, the surfactant comprises the amphoteric surfactant. Amphoteric surfactants, include, for example, amino acid surfactants, betaine acid surfactants, trimethylnonyl polyethylene glycol ethers and polyethylene glycol ether alcohols containing linear alkyl groups having from 11 to 15 carbon atoms, such as 2,6,8-trimethyl-4-nonyloxypolyethylene oxyethanol (6 EO) (sold as Tergitol®TMN-6 by OSi Specialties, A Witco Company, Endicott, NY), 2,6,8-trimethyl-4-nonyloxypolyethylene oxyethanol (10 EO) (sold as Tergitol®TMN-10 by OSi Specialties, A Witco Company, Endicott, NY), alkylene-oxypolyethylene oxyethanol ($C_{11-15}$ secondary alkyl, 9 EO) (sold as Tergitol®15-S-9 by OSi Specialties, A Witco Company, Endicott, NY), alkylene-oxypolyethylene oxyethanol ($C_{11-15}$ secondary alkyl, 15 EO) (sold as Tergitol®15-S-15 by OSi Specialties, A Witco Company, Endicott, NY), octylphenoxy polyethoxy ethanols having varying amounts of ethylene oxide units such as octylphenoxy polyethoxy ethanol (40 EO) (sold as Triton® X405 by Rohm and Haas Company, Philadelphia, Pa.), nonionic ethoxylated tridecyl ethers available from Emery Industries, Mauldin, S.C. under the general tradename Trycol, alkali metal salts of dialkyl sulfosuccinates available from American Cyanamid Company, Wayne, N.J. under the general tradename Aerosol, polyethoxylated quaternary ammonium salts and ethylene oxide condensation products of the primary fatty amines (available from Armak Company, Chicago, Illinois under the tradenames Ethoquad, Ethomeen, or Arquad), polyoxyalkylene glycol modified polysiloxanes, N-alkylamidobetaines and derivatives thereof, proteins and derivatives thereof, glycine derivatives, sultaines, alkyl polyaminocarboxylates and alkylamphoacetates, and mixtures thereof. These surfactants may also be obtained from other suppliers under different tradenames.

One of skill in the art can readily optimize relative amounts of components in the emulsion and methods of its preparation. For example, when the release coating composition (e.g. as the curable composition) is in the form of the emulsion, the emulsion can be a two-part emulsion to separate the reactive components and/or catalyst therefrom. In some embodiments, the emulsion is prepared comprising a specific non-volatile content (NVC). NVC may be determined by evaluating a sample of the emulsion via microwave-mediated drying with continuous mass balance, e.g. using a Smart System5 Moisture and Solids Analyzer available from CEM Corporation of Matthews, North Carolina, USA (i.e., a microprocessor-controlled system including integrated microwave drying chamber, electronic balance, and infrared temperature controller). As will be understood by those of skill in the art, NVC is calculated and reported (in wt. %) based on the weight of solids remaining after sample drying. In some embodiments, the release coating composition is prepared as the emulsion comprising a NVC of from 25 to 60 wt. %, such as from 30 to 50, alternatively from 35 to 45, alternatively from 39 to 43 wt. %.

A method of preparing a coated substrate with the composition comprises applying, i.e., disposing, the composition on the substrate. The method further comprises curing the curable composition on the substrate, which results in the formation of the release coating on the substrate to give the coated substrate. Curing may be performed by heating at an elevated temperature, e.g., 50° C. to 180° C., alternatively 50° C. to 120° C., and alternatively 50° C. to 90° C., to give the coated substrate. One skilled in the art would be able to select an appropriate temperature depending on various factors including the selection of the components in the curable composition and the substrate composition or material of construction.

The curable composition may be disposed or dispensed on the substrate in any suitable manner. Typically, the curable composition is applied in wet form via a wet coating technique. The curable composition may be applied by i) spin coating; ii) brush coating; iii) drop coating; iv) spray coating; v) dip coating; vi) roll coating; vii) flow coating; viii) slot coating; ix) gravure coating; x) Meyer bar coating; or xi) a combination of any two or more of i) to x). Typically, disposing the curable composition on the substrate results in a wet deposit on the substrate, which is subsequently cured to give the coated substrate, which comprises a cured film, i.e., the release coating, formed from the curable composition on the substrate.

The substrate is not limited and may be any substrate. The cured film may be separable from the substrate or may be physically and/or chemically bonded to the substrate depending on its selection. The substrate may have an integrated hot plate or an integrated or stand-alone furnace for curing the wet deposit. The substrate may optionally have a continuous or non-continuous shape, size, dimension, surface roughness, and other characteristics. Alternatively, the substrate may have a softening point temperature at the elevated temperature. However, the curable composition and method are not so limited.

Alternatively, the substrate may comprise a plastic, which maybe a thermosetting and/or thermoplastic. However, the substrate may alternatively be or comprise glass, metal, cellulose (e.g. paper), wood, cardboard, paperboard, a silicone, or polymeric materials, or a combination thereof.

Specific examples of suitable substrates include paper substrates such as Kraft paper, polyethylene coated Kraft paper (PEK coated paper), thermal paper, and regular papers; polymeric substrates such polyamides (PA); polyesters such as polyethylene terephthalates (PET), polybutylene terephthalates (PET), polytrimethylene terephthalates (PTT), polyethylene naphthalates (PEN), and liquid crystalline polyesters; polyolefins such as polyethylenes (PE), polypropylenes (PP), and polybutylenes; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones; polyvinyl alcohols (PVA); polyetheretherketones (PEEK); polyetherketoneketones (PEKK); polyarylates (PAR); polyethernitriles (PEN); phenolic resins; phenoxy resins; celluloses such as triacetylcellulose, diacetylcellulose, and cellophane; fluorinated resins, such as polytetrafluoroethylenes; thermoplastic elastomers, such as polystyrene types, polyolefin types, polyurethane types, polyester types, polyamide types, polybutadiene types, polyisoprene types, and fluoro types; and copolymers, and combinations thereof.

The curable composition, or wet deposit, is typically cured at the elevated temperature for a period of time. The period of time is typically sufficient to effect curing, i.e., cross-linking, of the curable composition. The period of time may be from greater than 0 to 8 hours, alternatively from greater than 0 to 2 hours, alternatively from greater than 0 to 1 hour, alternatively from greater than 0 to 30 minutes, alternatively from greater than 0 to 15 minutes, alternatively from greater than 0 to 10 minutes, alternatively from greater than 0 to 5 minutes, alternatively from greater than 0 to 2 minutes. The period of time depends on various factors including on the elevated temperature is utilized, the temperature selected, desired film thickness, and the presence of absence of any water or vehicle in the curable composition.

Curing the curable composition typically has a dwell time of from 0.1 second to 50 seconds; alternatively from 1 second to 10 seconds; and alternatively from 0.5 second to 30 seconds. Dwell time selected may depend on the substrate selection, temperature selected, and line speed. Dwell time, as used herein, refers to the time during which the curable composition, or wet deposit, is subjected to the elevated temperature. Dwell time is distinguished from cure time, as there may be ongoing curing even after the curable composition, wet deposit, or partially cured reaction intermediary thereof is no longer subjected to the elevated temperature, which typically initiates curing. Alternatively, the coated article may be prepared on a conveyor belt in an oven, and the dwell time may be calculated by dividing a length of the oven (e.g. in meters) by a line speed of the conveyor belt (e.g. in meters/sec).

The period of time may be broken down into cure iterations, e.g. a first-cure and a post-cure, with the first-cure being, for example, one hour and the post cure being, for example, three hours. The elevated temperature may be independently selected from any temperature above room temperature in such iterations, and may be the same in each iteration.

Depending on the optional presence and selection of the (I) vehicle, curing the composition may also include the step of drying. For example, when the composition is in the form of an emulsion such that the (I) vehicle is present and comprises water, the step of curing typically also removes drying or removing water from the emulsion. Drying may be contemporaneous with curing or may be separate from curing.

Depending on a thickness and other dimensions of the film and coated substrate, the coated substrate can be formed via an iterative process. For example, a first deposit may be formed and subjected to a first elevated temperature for a first period of time to give a partially cured deposit. Then, a second deposit may be disposed on the partially cured deposit and subjected to a second elevated temperature for a second period of time to give a second partially cured deposit. The partially cured deposit will also further cure during exposure to the second elevated temperature for the second period of time. A third deposit may be disposed on the second partially cured deposit and subjected to a third elevated temperature for a third period of time to give a third partially cured deposit. The second partially cured deposit will also further cure during exposure to the second elevated temperature for the second period of time. This process may be repeated, for example, from 1 to 50 times, to build the coated article as desired. A composite is of partially cured layers may be subjected to a final post-cure, e.g. at the elevated temperature and period of time above. Each elevated temperature and period of time may be independently selected and may be the same as or different from one another. When the article is formed via the iterative process, each deposit may also be independently selected and may differ in terms of components selected in the curable composition, their amounts, or both. Alternatively still, each iterative layer may be fully cured, rather than only being partially cured, in such an iterative process.

Alternatively, the deposit may comprise a wet film. Alternatively, the iterative process may be wet-on-wet, depending on a cure state of the partially cured layer. Alternatively, the iterative process may be wet-on-dry.

The coated substrate, which comprises the film formed from the curable composition on the substrate, may have varying dimensions, including relative thicknesses of the film and the substrate. The film has a thickness that may vary depending upon its end use application. The film may have a thickness of greater than 0 to 4,000 µm, alternatively greater than 0 to 3,000 µm, alternatively greater than 0 to 2,000 µm, alternatively greater than 0 to 1,000 µm, alternatively greater than 0 to 500 µm, alternatively greater than 0 to 250 µm. However, other thicknesses are contemplated, e.g. 0.1 to 200 µm. For example, the thickness of the film may be 0.2 to 175 µm; alternatively 0.5 to 150 µm; alternatively 0.75 to 100 µm; alternatively 1 to 75 µm; alternatively 2 to 60 µm; alternatively 3 to 50 µm; and alternatively 4 to 40 µm. Alternatively, when the substrate is plastic, the film may have a thickness of greater than 0 to 200, alternatively greater than 0 to 150 µm, and alternatively greater than 0 to 100 µm.

If desired, the film may be subjected to further processing depending upon its end use application. For example, the film may be subjected to oxide deposition (e.g. $SiO_2$ deposition), resist deposition and patterning, etching, chemical, corona, or plasma stripping, metallization, or metal deposition. Such further processing techniques are generally known. Such deposition may be chemical vapor deposition (including low-pressure chemical vapor deposition, plasma-enhanced chemical vapor deposition, and plasma-assisted chemical vapor deposition), physical vapor deposition, or other vacuum deposition techniques. Many such further processing techniques involve elevated temperatures, particularly vacuum deposition, for which the film is well suited in view of its excellent thermal stability. Depending on an end use of the film, however, the film may be utilized with such further processing.

The coated substrate may be utilized in diverse end use applications. For example, the coated substrate may be utilized in coating applications, packaging applications, adhesive applications, fiber applications, fabric or textile applications, construction applications, transportation applications, electronics applications, or electrical applications. However, the curable composition may be utilized in end use applications other than preparing the coated substrate, e.g. in the preparation of articles, such as silicone rubbers.

Alternatively, the coated substrate may be utilized as a release liner, e.g. for a tape or adhesive, including any pressure-sensitive adhesives, including acrylic resin-type pressure-sensitive adhesives, rubber-type pressure-sensitive adhesives, and silicone-type pressure-sensitive adhesives, as well as acrylic resin-type adhesives, synthetic rubber-type adhesives, silicone-type adhesives, epoxy resin-type adhesives, and polyurethane-type adhesives. Each major surface of the substrate may having a film disposed thereon for double sided tapes or adhesives.

Alternatively, when the curable composition will be formulated as a release coating composition, e.g. for forming a release coating or liner, the release coating composition may be prepared by mixing the components together, for example, to prepare a one part composition. However, it may be desirable to prepare a release coating composition as a multiple part composition, in which components having SiH functionality (e.g., the (C) organosilicon compound) and the (D) hydrosilylation-reaction catalyst are stored in separate parts, until the parts are combined at the time of use (e.g., shortly before application to a substrate). When the curable composition is the release coating composition, the release coating composition can utilized to form the coated substrate as described above, and the release coating is formed by applying and curing the release coating composition on the substrate, e.g. a surface of the substrate.

For example, a multiple part curable composition may comprise:

Part (A), a base part comprising the (A) organopolysiloxane, the (B) organopolysiloxane including an average of at least two silicon-bonded ethylenically unsaturated groups per molecule, and (D) the hydrosilylation-reaction catalyst, and optionally when present, one or more of, the (F) anchorage additive, and the (I) vehicle, and Part (B), a curing agent part comprising the (C) organosilicon compound having an average, per molecule, of at least two silicon bonded hydrogen atoms per molecule, and optionally when present, the (F) anchorage additive and/or the (I) vehicle. When utilized, the (E) inhibitor may be added to either Part (A), Part (B), or both. Part (A) and Part (B) may be combined in a weight ratio (A):(B) of 1:1 to 30:1, alternatively 1:1 to 10:1, alternatively 1:1 to 5:1, and alternatively 1:1 to 2:1. Part (A) and Part (B) may be provided in a kit with instructions, e.g., for how to combine the parts to prepare the release coating composition, how to apply the release coating composition to a substrate, and how to cure the release coating composition.

Alternatively, when the (F) anchorage additive is present, it can be incorporated in either of Part (A) or Part (B), or it can be added in a separate (third) part.

The release coating composition can for example be applied to the substrate by any convenient means such as spraying, doctor blade, dipping, screen printing or by a roll coater, e.g. an offset web coater, kiss coater or etched cylinder coater.

The release coating composition of the invention can be applied to any substrate, such as those described above. Alternatively, the release coating composition may be applied to polymer film substrates, for example polyester, particularly polyethylene terephthalate (PET), polyethylene, polypropylene, or polystyrene films. The release coating composition can alternatively be applied to a paper substrate, including plastic coated paper, for example paper coated with polyethylene, glassine, super calender paper, or clay coated kraft. The release coating composition can alternatively be applied to a metal foil substrate, for example aluminum foil.

In certain embodiments, the method of preparing the coated substrate may further comprise treating the substrate before applying or disposing the release coating composition on the substrate. Treating the substrate may be performed by any convenient means such as a plasma treatment or a corona discharge treatment. Alternatively, the substrate may be treated by applying a primer. In certain instances, anchorage of the release coating may be improved if the substrate is treated before forming the release coating thereon from the release coating composition.

When the release coating composition includes the (I) vehicle, the method may further comprise removing the (I) vehicle, which may be performed by any conventional means, such as heating at 50° C. to 100° C. for a time sufficient to remove all or a portion of the (I) vehicle. The method may further comprise curing the release coating composition to form the release coating on a surface of the substrate. Curing may be performed by any conventional means such as heating at 100° C. to 200° C.

Under production coater conditions, cure can be effected in a residence time of 1 second to 6 seconds, alternatively 1.5 seconds to 3 seconds, at an air temperature of 120° C. to 150° C. Heating can be performed in an oven, e.g., an air circulation oven or tunnel furnace or by passing the coated film around heated cylinders.

The following examples are intended to illustrate the invention and are not to be viewed in any way as limiting to the scope of the invention. Certain components utilized in the Examples are set forth in Table 1 below, followed by characterization and evaluation procedures also used in the Examples.

TABLE 1

Components

| Component | Chemical Description |
| --- | --- |
| Silicone Resin (ia) | MQ resin of formula: $M_{42}Q_{58}$ (i.e., $M_{0.72}Q$) ($M_{0.82}Q$ by $^{29}Si$—NMR) |
| Silicone Resin (ib) | MQ resin of formula: $M_{0.76}MV_{0.09}Q$ |
| Cyclic Siloxane (ii) | Octamethylcyclotetrasiloxane |
| Polymerization Catalyst 1 | Trimethylamine hydroxide phosphazene base of formula: $[(NMe_2)_3PN(P(NMe_2)_2N)nP(NMe_2)_3][OH]$, with n = 1 and 2 |
| Organopolysiloxane (B1) | Vinyl end-blocked Q-branched polymer of formula: $M^{Vi}_4D_{227}Q$ ($M^{Vi}_{4.6}D_{289}Q$ by $^{29}Si$—NMR) |
| Organopolysiloxane (B2) | Vinyl end-blocked Q-branched polymer of formula: $M^{Vi}_{4.6}D_{100}Q$ |
| Organopolysiloxane (A-C1) | Vinyl-functional $M_XDQ$ (x > 1) of formula $M^{Vi}_{1.69n}M^{OZ}0.32n$ $D_{358.61n}Q_{1.00n}$, where n > 1 such that Component (A-C1) includes more than one Q siloxy unit, and where Z is independently alkyl or H |
| Organopolysiloxane (A-C2) | Physical blend of equivalent amounts of vinyl-terminated polydimethylsiloxane and $M_{0.76}M^{Vi}_{0.09}Q$ and less than 4 wt % $M_{0.96}Q$ |
| Organopolysiloxane (A-C3) | Physical blend of $M_{0.76}M^{Vi}_{0.09}Q$ and Organopolysiloxane (B1) |
| Organopolysiloxane (A-C4) | Physical blend of a resin-linear copolymer with MQ moieties and D moieties linked via condensation and Organosiloxane (B1) |
| Organopolysiloxane (A-C5) | MQ Resin prepared via condensation reaction in accordance with Synthesis Example 1 of U.S. Pat. No. 8,933,177 |
| Inhibitor 1 | Bis(trimethylsilyl)hydrogen phosphate; $[((CH_3)_3SiO)_2PO_2H]$ |
| Inhibitor 2 | Ethynyl cyclohexanol ($HC\equiv CC_6H_{10}OH$) |
| Solvent 1 | Toluene ($C_7H_8$) |
| Solvent 2 | Methanol ($CH_3OH$) |
| Solvent 3 | n-decane ($C_{10}H_{22}$) |
| Organosilicon Compound (C1) | $Me_3Si$-terminated methylhydrogen homopolymer ($MD^{Me,H}_{25}M$) |
| Organosilicon Compound (C2) | 75:25 blend of $MD^{Me2}_6D^{Me,H}_{39}M$ and $MD^{Me,H}_{43}M$ |
| Catalyst (D1) | Karstedt's catalyst in vinyl-functional siloxane. |

Nuclear Magnetic Resonance Spectroscopy (NMR)

Nuclear magnetic resonance (NMR) spectra are obtained on a NMR BRUKER AVIII (400 MHz), using a silicon-free 10 mm tube and $CDCl_3/Cr(AcAc)_3$ solvent. Chemical shifts for $^{29}$Si-NMR spectra are referenced to internal solvent resonance and are reported relative to tetramethylsilane.

Gel Permeation Chromatography (GPC)

Gel permeation chromatography (GPC) analysis is conducted on an Agilent 1260 Infinity II chromatograph equipped with a triple detector composed of a differential refractometer, an online differential viscometer, a low angle light scattering (LALS: 15° and 90° angles of detection), and a column (2 PL Gel Mixed C, Varian). Toluene (HPLC grade, Biosolve) is used as mobile phase, at a flow rate of 1 mL/min.

Dynamic Viscosity (DV)

Dynamic viscosity (DV) is measured with a Brookfield DV-III Ultra Programmable Rheometer equipped with a CPA-52Z spindle, using a sample volume of 0.5 mL, at a temperature of 25° C.

X-Ray Fluorescence (XRF)

X-Ray Fluorescence (XRF) is conducted on an Oxford Instruments Lab-X 3500 Benchtop XRF analyzer.

Mist Level Evaluation (MLE)

Mist evaluation is conducted using a mist evaluation system including a custom-built 2-roll coater disposed in an enclosed chamber equipped with a ventilation system. The coater includes a top roll (chrome) arranged in a stacked configuration over a rubber bottom roll (neoprene), which is arranged over a sample pan and driven by a motor (rotation of 1000 meters per minute, during operation). Each roll is 6 inches in diameter and 12 inches wide. The ventilation system is configured to draw air to a back wall of the enclosure, and includes a magnehelic gauge positioned at the ceiling of the enclosure to measure/monitor air flow (rate of 0.20-0.25 inches of water (i.e., 0.05-0.062 kPa), at the magnehelic gauge), two mist collection pipes positioned above the center of the top roll (6 inches) of the coater to collect mist, and an aerosol monitor (DustTrak 8530, recording mist level every 5 seconds) connected to each mist collection pipe.

A sample (600 g) is disposed into the sample pan, which is inserted below the bottom roll to be picked up and transferred to the top roll as a film. The coater is operated for 6 minutes, and mist generated therefrom is collected by the mist collection pipes and measured by the aerosol monitor. Mist levels obtained between 120 s to 360 s are averaged and reported at a mist value for the sample.

Mist Level Industrial Evaluation (MLIE)

Mist level industrial evaluation (MLIE) is conducted on an industrial pilot line based on a 6-roll coating head having five rollers in a stacked configuration of alternating chrome steel and rubber-sleeved rolls. Specifically, two bottom rolls are aligned horizontally together to form a nip where a coating bath is held (i.e., the "first nip"), and the remaining rolls are aligned vertically to facilitate sample transfer from one roll to the next between the coating bath and a paper surface to be coated at a nip formed between the top two rolls (i.e., the "second nip"). Each roll is independently driven by a separate motor. A mist collection fixed pipe is located less than 20 cm from the second nip and connected to an aerosol monitor (DustTrak 8530).

A sample is disposed in the coating bath, and each roll is independently driven at a separate speed and pressed together using independent pressure settings to facilitate a stepwise reduction in coating thickness along the roller line from the coating bath to a paper surface. The top 2 rolls are driven at speeds close to a final desired speed (e.g. rotation of 1000 m/min) for a mist evaluation period, during which time mist levels are recorded and averaged and reported as a mist value (in mg/m$^3$) for the sample.

Cure Performance: Extractable Percentage

Cure performance of a sample composition is evaluated by determining an extractable percent value (extractable %). In particular, a sample composition is coated and cured on a substrate (Glassine paper) to form a coated substrate, which is immediately cut into three sample discs (die cutter, 1.375 inch (3.49 cm)) handled only by tweezers to minimize contamination and/or damage. Each sample disc is analyzed via XRF to determine an initial coat weight ($W^i_s$) before being placed in an individual bottle (100-mL, covered with a lid) containing solvent (methyl isobutyl ketone, 40 mL) and allowed to rest on a bench to soak for 30 minutes. Each sample disc is then removed from the bottle, placed coated-side-up on a clean surface (tissue paper) to allow residual solvent to evaporate (without blotting/wiping), and analyzed via XRF to determine a final coat weight ($W^f_s$). The extractable % of each sample is the percent change in coat weight from the solvent soak, i.e., is calculated using the formula: $[(W^i_s - W^f_s)/Wi] \times 100\%)$. The extractable % indicates the amount of non-cured components of the sample composition (e.g. non-crosslinked silicone) extractable from the coated substrate, such as a lower extractable % indicates a higher/better cure performance.

Cure Performance: Anchorage (ROR %)

The anchorage of a sample composition is evaluated via anchorage index, i.e., by determining a percent rub-off resistance (ROR %) value. In particular, a sample composition is coated and cured on a substrate (Glassine paper) to form a coated substrate. Immediately following cure, the coated substrate is cut into two sample discs (die cutter, 1.375 inch (3.49 cm)), which are each analyzed via XRF to determine an initial coat weight ($W^i_a$). Each sample disc is then abraded with a felt under load (1.9 kg) using automated abrading equipment, in a method similar to a Taber-type abrasion test (e.g. such as that of ASTM D4060-19, "Standard Test Method for Abrasion Resistance of Organic Coatings by the Taber Abraser"), and subsequently analyzed via XRF to determine a final coat weight ($W^f_a$). The ROR % of each sample is calculated using the formula: $[W^f_s/W^i_s] \times 100\%)$. The ROR % indicates how strong the coating is anchored to the substrate, such that a higher ROR % indicates a higher/better anchorage the higher the ROR % value the better.

Preparation Example 1: Bodied Silicone Resin (ia)
[MxDQ Resin (x<1): $M_{0.7}Q$]

Silicone Resin (ia) is bodied to prepare a bodied Silicone Resin (ia) having the formula $M_{0.7}Q$. In particular, Silicone Resin (ia) (42.5 g) and Solvent 1 (42.5 g) are combined to form a mixture in a single neck flask connected to a Dean Stark (DS) apparatus under nitrogen blanketing, and the DS apparatus is filled with Solvent 1. The mixture is heated to and held at reflux for 6 hours, with a few drops of water collected at the bottom of the DS apparatus. The mixture is cooled to room temperature to give a bodied Silicone Resin (ia) ($M_{0.7}Q$, in Solvent 1) ($M_{0.82}Q$ by $^{29}$Si-NMR). A sample is taken from the mixture and analyzed via $^{29}$Si-NMR against a sample of the initial Silicone Resin (ia), showing a determine a Q3-type SiOH reduction of approximately 10% through condensation).

Preparation Example 2: Organopolysiloxane (A1) [MxDQ Resin (x<1)]

A silicone resin is reacted with a cyclic siloxane to prepare an Organopolysiloxane (A). In particular, the bodied Silicone Resin (ia) prepared above (3.6 g) and Cyclic Siloxane (ii) (124.5 g) are combined in an inert kettle atmosphere, and heated to and held at 120° C. with stirring to give a blend. Polymerization Catalyst 1 (284.7 µL; diluted in Solvent 2 at 4.0 wt %) is then added to the blend to give a reaction mixture, which is stirred for 10 minutes. The reaction mixture is then heated to and held at 150° C. until polymerization is complete, and then charged with Inhibitor 1 (104 µL) to give a reaction product comprising an organopolysiloxane of formula $M_{0.7}D_{221}Q$ (theoretical, "Organopolysiloxane (A1)").

Preparation Example 3: Bodied Silicone Resin (ib)

Silicone Resin (ib) is bodied to prepare a bodied Silicone Resin (ib) having the formula $M_{0.76}M^{Vi}_{0.09}Q$. In particular, Silicone Resin (ib) (37.52 g) and Solvent 1 (37.52 g) are combined to form a mixture in a single neck flask connected to a Dean Stark (DS) apparatus under nitrogen blanketing, and the DS apparatus is filled with Solvent 1. The mixture is heated to and held at reflux for 7 hours, with a few drops of water collected at the bottom of the DS apparatus. The mixture is cooled to room temperature to give a bodied Silicone Resin (ia) of formula ($M_{0.76}M^{Vi}_{0.09}Q$)

Preparation Example 4: Organopolysiloxane (A2)

A silicone resin is reacted with a cyclic siloxane to prepare an Organopolysiloxane (A). In particular, the bodied Silicone Resin (ib) prepared above in Preparation Example 3 (12.7 g of bodied Silicone Resin (ib) diluted in 50% Solvent 1) and Cyclic Siloxane (ii) (668.0 g) are combined in an inert kettle atmosphere, and heated to and held at 120° C. with stirring to give a blend. Polymerization Catalyst 1 (509.0 µL; diluted in Solvent 2 at 10.0 wt %) is then added to the blend to give a reaction mixture, which is stirred for 10 minutes. The reaction mixture is then heated to and held at 160° C. until polymerization is complete, and then charged with Inhibitor 1 (464 µL) to give a reaction product. The reaction product is diluted in Organopolysiloxane (B1) and stripped to remove residual Cyclic Siloxane (ii). The reaction product includes Organopolysiloxane (A2) of formula $M_{0.76}M^{Vi}_{0.09}D_{260}Q$ (theoretical).

Preparation Example 5: Organopolysiloxane (A3)

A silicone resin is reacted with a cyclic siloxane to prepare an Organopolysiloxane (A). In particular, the Silicone Resin (ib) (2.37 g) and Cyclic Siloxane (ii) (248.5 g) are combined in an inert kettle atmosphere, and heated to and held at 120° C. with stirring to give a blend. Polymerization Catalyst 1 (189.0 µL; diluted in Solvent 2 at 10.0 wt %) is then added to the blend to give a reaction mixture, which is stirred for 10 minutes. The reaction mixture is then heated to and held at 160° C. until polymerization is complete, and then charged with Inhibitor 1 (173 µL) to give a reaction product. The reaction product is diluted in Organopolysiloxane (B1) and stripped to remove residual Cyclic Siloxane (ii). The reaction product includes Organopolysiloxane (A3) of formula $M_{0.76}M^{Vi}_{0.09}D_{260}Q$ (theoretical). Unlike in Preparation Example 4 above, the Organopolysiloxane (A3) formed in Preparation Example 5 utilizes the Silicone Resin (ib) without any step of bodying. Thus, Organopolysiloxane (A3) has less SiOZ content in the Q type siloxy units than the Organopolysiloxane (A2).

Preparation Example 6: Organopolysiloxane (A4)

A silicone resin is reacted with a cyclic siloxane to prepare an Organopolysiloxane (A). In particular, the Silicone Resin (ib) (0.95 g) and Cyclic Siloxane (ii) (125.0 g) are combined with Solvent 3 (10 g) in an inert kettle atmosphere, and heated to and held at 120° C. with stirring to give a blend. Polymerization Catalyst 1 (75.7 µL; diluted in Solvent 2 at 10.0 wt %) is then added to the blend to give a reaction mixture, which is stirred for 10 minutes. The reaction mixture is then heated to and held at 160° C. until polymerization is complete, and then charged with Inhibitor 1 (69 µL) to give a reaction product. The reaction product is diluted in Organopolysiloxane (B1) and stripped to remove residual Cyclic Siloxane (ii). The reaction product includes Organopolysiloxane (A4) of formula $M_{0.76}M^{Vi}_{0.09}D_{260}Q$ (theoretical). Unlike in Preparation Example 4 above, the Organopolysiloxane (A4) formed in Preparation Example 6 utilizes the Silicone Resin (ib) without any step of bodying. Thus, Organopolysiloxane (A4) has less SiOZ content in the Q type siloxy units than the Organopolysiloxane (A2). Unlike in Preparation Example 5 above, Preparation Example 6 forms its Organopolysiloxane (A) in a solvent.

Preparation Example 7: Organopolysiloxane (A5)

A silicone resin is reacted with a cyclic siloxane to prepare an Organopolysiloxane (A). In particular, the bodied Silicone Resin (ia) prepared above in Preparation Example 1 (1.5 g diluted in Solvent 1 at 50 wt. %) and Cyclic Siloxane (ii) (124.7 g) are combined in an inert kettle atmosphere, and heated to and held at 120° C. with stirring to give a blend. Polymerization Catalyst 1 (142.5 µL; diluted in Solvent 2 at 4.0 wt %) is then added to the blend to give a reaction mixture, which is stirred for 10 minutes. The reaction mixture is then heated to and held at 160° C. until polymerization is complete, and then charged with Inhibitor 1 (51.8 µL) to give a reaction product comprising an organopolysiloxane of formula $M_{0.7}D_{527}Q$ (theoretical, "Organopolysiloxane (A5)").

Preparation Example 8: Organopolysiloxane (A6)

A silicone resin is reacted with a cyclic siloxane to prepare an Organopolysiloxane (A). In particular, the bodied Silicone Resin (ia) prepared above in Preparation Example 1 (18.80 g diluted in Solvent 1 at 50 wt. %) and Cyclic Siloxane (ii) (493.32 g) are combined in an inert kettle atmosphere, and heated to and held at 120° C. with stirring to give a blend. Polymerization Catalyst 1 (379 µL; diluted in Solvent 2 at 10.0 wt %) is then added to the blend to give a reaction mixture, which is stirred for 10 minutes. The reaction mixture is then heated to and held at 170° C. until polymerization is complete, and then charged with Inhibitor 1 (104 μL) to give a reaction product comprising an organopolysiloxane of formula $M_{0.7}D_{167}Q$ (theoretical, "Organopolysiloxane (A6)").

Comparative Composition (CC1)

Organopolysiloxane (B1) is tested and/or analyzed as a blank/control alongside certain examples below, and referred to therein as Composition (CC1).

Comparative Composition (CC2)

Organopolysiloxane (A-C1) is tested and/or analyzed alongside certain examples below, and referred to therein as Composition (CC2).

Examples 1-4 & Comparative Examples 1-2: Base Compositions

Various Base Compositions for forming release coatings are prepared. In particular, in each Base Composition, each particular Organopolysiloxane (A) is diluted to 40 wt. % in Organopolysiloxane (B1) (if not already done in the Preparation Examples above). Example 1 is Base Composition 1 and includes Organopolysiloxane (A1). Example 2 is Base Composition 2 includes Organopolysiloxane (A3). Example 3 is Base Composition 3 and includes Organopolysiloxane (A4). Example 4 is Base Composition 4 and includes Organopolysiloxane (A5). Each base composition was then analyzed via $^{29}$Si-NMR, GPC, and DV. Base Composition 1 had a molecular weight as measured by GPC of 107,422, and a PDI of 12.6. The results of these analyses are set forth in Table 2 below, alongside results similarly obtained from analyzing Composition (CC1) and Composition (CC2) (Comparative Examples 1 and 2, respectively).

TABLE 2

Components and Properties of Example 1 & Comparative Examples 1-2

| Example | Composition | Viscosity (cP) | Final Composition (mole %) | | | |
|---|---|---|---|---|---|---|
| | | | M | MV | D | Q |
| Comp. Ex. 1 | CC1 | 360 | 0 | 1.56 | 98.10 | 0.34 |
| Comp. Ex. 2 | CC2 | 40,000 | 0 | 0.39 | 99.45 | 0.16 |
| Ex. 1 | Base Comp. 1 | 20,240* | 0.14 | 1.04 | 98.36 | 0.46 |
| Ex. 2 | Base Comp. 2 | 8,930 | 0.13 | 0.95 | 98.58 | 0.34 |
| Ex. 3** | Base Comp. 3 | 8,682 | 0.16 | 0.04 | 99.49 | 0.28 |
| Ex. 4*** | Base Comp. 4 | 1,500 | 0.04 | 1.3 | 98.35 | 0.31 |

*as measured at 3 rpm; viscosity was 32,450 cP at 1 rpm.
**$^{29}$Si-NMR measured for Organopolysiloxane (A4) in Solvent 3 instead of Organopolysiloxane (B1).
***as measured for Organopolysiloxane (A5) diluted at 19 wt.% in Organopolysiloxane (B1)

Examples 5 and 6 & Comparative Examples 3-5: Compositions

Compositions for forming release coatings are prepared. In particular, in Example 5, Base Composition 1 is combined with and diluted to 2 wt. % of Organopolysiloxane (A1) in Organopolysiloxane (B1) and Inhibitor 2 to give a composition. In Example 6, Base Composition 2 is combined with and diluted to 1 wt. % of Organopolysiloxane (A3) in Organopolysiloxane (B1) and Inhibitor 2 to give a composition. The compositions of Example 5 and 6 are then analyzed via DV, and evaluated via MLE, the results of which are set forth in Table 3 below. Comparative Example 5 is similar to Example 6 but utilizes Organopolysiloxane (A-C1) in lieu of Organopolysiloxane (A3).

TABLE 3

Components and Properties of Examples 5 and 6 & Comparative Examples 3 and 4

| Component/Property | Ex.5 | Ex.6 | Comp. Ex. 3 | Comp. Ex. 4 | Comp. Ex. 5 |
|---|---|---|---|---|---|
| Organopolysiloxane (B1) (wt. %): | 97.75 | 98.75 | 100 | 97.75 | 98.75 |
| Organopolysiloxane (A-C1) | 0 | 0 | 0 | 2 | 1 |
| Organopolysiloxane (A1) (wt. %): | 2 | 0 | 0 | 0 | 0 |
| Organopolysiloxane (A3) (wt. %) | 0 | 1 | 0 | 0 | 0 |
| Inhibitor 2 (wt. %): | 0.25 | 0.25 | 0 | 0.25 | 0.25 |
| Viscosity (cP): | 440 | unknown | 360 | 400 | unknown |
| Mist (mg/m$^3$): | 2.3 | 4.5 | 175.3 | 8.7 | 14.4 |

As shown, Examples 5 and 6 greatly suppresses mist formation during application (roll-coating) of a coating composition. Moreover, misting was nearly 4 times lower when utilizing the inventive composition as compared to a conventional/comparative aerosol/mist suppressant.

Comparative Examples 6-9: Base Compositions

Various base compositions for forming release coatings were prepared by diluting an organopolysiloxane to 2 wt. % in Organopolysiloxane (B1) to give comparative compositions, which were evaluated via MLE. The particular components, parameters, and evaluation results of Comparative Examples 6-9 are set forth in Table 4 below.

TABLE 4

Components and Properties of Comparative Examples 6-9

| Component/Property | Comp. Ex. 6 | Comp. Ex. 7 | Comp. Ex. 8 | Comp. Ex. 8 |
|---|---|---|---|---|
| Organopolysiloxane (B1) (g): | 95.5 | 95.2 | 92 | 92.6 |
| Organopolysiloxane (A-C2) (g): | 5.13 | / | / | / |
| Organopolysiloxane (A-C3) (g): | / | 4.8 | / | / |
| Organopolysiloxane (A-C4) (g): | / | / | 8 | / |
| Organopolysiloxane (A-C5) (g): | / | / | / | 7.4 |
| Mist (mg/m$^3$): | 143 | 134 | 60 | 53 |

Examples 7-8 & Comparative Examples 10-11: Compositions

Various compositions for forming release coatings are prepared according to the procedures above using the components and parameters set forth in Table 5 below.

TABLE 5

Components and Parameters of Examples 7 and 8 & Comparative Examples 10 and 11

| Component/Parameter | Comp. Ex. 10 | Comp. Ex. 11 | Ex. 7 | Ex. 8 |
|---|---|---|---|---|
| Organopolysiloxane (B1) (g): | 92.88 | / | 90.14 | / |
| Organopolysiloxane (B2) (g): | / | 88.88 | / | 86.39 |
| Base Composition 1 (g): | / | / | 5 | 5 |
| Inhibitor 2 (g): | 0.12 | 0.12 | 0.1125 | 0.1125 |
| Organopolysiloxane (A-C1) (g): | 2 | 2 | / | / |
| Organosilicon Compound (C1) (g): | 4 | 8 | 3.75 | 7.5 |
| Catalyst (D1) (g): | 1 | 1 | 1 | 1 |
| Percent AMA (wt.%): | 2 | 2 | 2 | 2 |
| SiH:Vi mol ratio: | 2 | 2 | 2 | 2 |
| Pt level (ppm): | 52 | 52 | 52 | 52 |

Examples 7-8 & Comparative Examples 10-11: Coated Substrates

The compositions of Examples 7-8 and Comparative Examples 10-11 are utilized to prepare coated substrates. In particular, each composition is coated onto a substrate (Glassine paper) and cured (exit web oven temperature: 150° C.; dwell time: 4 s) to form a coated substrate, samples of which are evaluated for immediate extractable %, immediate ROR %, and 7-day release force (7dRF). The results of these evaluations are set forth in Table 6 below. The 7 day release force (7dRF) was measured at various speeds, namely at 0.3 m/min (MPM), 10 m/min (MPM), 100 m/min (MPM), and 300 m/min (MPM). The 7dRF was tested via an Imass SP-2100 and ZPE-1100W release test system after lamination with Tesa 7475 standard tape aged for seven days under 40 lbs at RT and 50% RH.

TABLE 6

Curing Performance of Examples 5 and 6 & Comparative Examples 11 and 12

| Property | Comp. Ex. 10 (avg. (sd)) | Comp. Ex. 11 (avg. (sd)) | Example 7 (avg. (sd)) | Example 8 (avg. (sd)) |
|---|---|---|---|---|
| Extractable % (%): | 3.6 (1.2) | 3.8 (0.6) | 3.2 (0.6) | 4.5 (0.7) |
| ROR% (%): | 94.4 (0.9) | 89.2 (0.3) | 94.8 (0.7) | 90.2 (0.2) |
| 7dRF 0.3 MPM (g/inch): | 69 (3) | 98 (4) | 50 (2) | 114 (4) |
| 7dRF 10 MPM (g/inch): | 115 (3) | 124 (2) | 93 (3) | 129 (3) |
| 7dRF 100 MPM (g/inch): | 166 (3) | 124 (4) | 156 (3) | 147 (2) |
| 7dRF 300 MPM : (g/inch) | 127 (6) | 123 (6) | 127 (1) | 114 (3) |

Examples 9-12 & Comparative Examples 12-13

Compositions for forming release coatings are prepared. Table 7 below sets forth the amounts of each component utilized in Examples 9-12 and Comparative Examples 12-13. Each composition is utilized and evaluated via MLIE as described above. Specifically, each composition of Examples 9-12 and Comparative Examples 12-13 is utilized to give a coat weight of from 1.1 to 1.2 g/m² and the mist level is measured via MLIE as described above.

TABLE 7

Components and Properties of Examples 9-12 & Comparative Examples 12-13

| Component/Property | Ex. 9 | Ex. 10 | Ex. 11 | Ex. 12 | Comp. Ex. 12 | Comp. Ex. 13 |
|---|---|---|---|---|---|---|
| Organopolysiloxane (B1) (wt. %): | 90.77 | 92.38 | 90.77 | 92.38 | 90.77 | 92.38 |
| Blend of 40 wt. % Organopolysiloxane (A2)in Organopolysiloxane (B1) (wt. %): | 4.045 | 2.365 | 0 | 0 | 0 | 0 |
| Blend of 40 wt. % Organopolysiloxane (A1)in Organopolysiloxane (B1) (wt. %): | 0 | 0 | 4.045 | 2.365 | 0 | 0 |
| Organopolysiloxane (A-C1) (wt. %): | 0 | 0 | 0 | 0 | 4.045 | 2.365 |
| Organosilicon Compound (C2) (wt. %): | 3.64 | 3.645 | 3.64 | 3.645 | 3.64 | 3.645 |
| Catalyst (D1) (wt. %): | 1.315 | 1.38 | 1.315 | 1.38 | 1.315 | 1.38 |
| Inhibitor 2 (wt. %): | 0.23 | 0.23 | 0.23 | 0.23 | 0.23 | 0.23 |
| Coat Weight (g/m²) | 1.17 | 1.16 | 1.18 | 1.15 | 1.14 | 1.13 |
| Mist (mg/m³): | 1.4 | 4.5 | 1.1 | 2.6 | 10.3 | 11.1 |

As shown, the inventive compositions provide fast cure rates with maintained anchorage, as demonstrated by the low immediate extractables and high rub-off resistance exhibited. Moreover, the inventive compositions provide a significant improvement in mist reduction.

Definitions and Usage of Terms

Abbreviations used in the specification have the definitions in Table 7, below.

TABLE 7

Abbreviations

| Abbreviation | Definition |
|---|---|
| cP or cps | centiPose |
| d | day |
| Da | Daltons |
| DP | degree of polymerization |
| FTIR | Fourier Transfer Infra-Red |
| g | grams |
| GC | gas chromatography |
| GPC | gel permeation chromatography |
| HPLC | high performance liquid chromatography |
| Me | methyl |
| mg | milligrams |
| MHz | megaHertz |
| mL | milliliters |
| mm | millimeters |
| Mn | number average molecular weight as measured by GPC |
| Mp | Peak molecular weight as measured by GPC |
| mPa · s | milli-Pascal seconds |
| MS | mass spectroscopy |
| Mw | weight average molecular weight |
| Mz | Z-average molecular weight |
| NMR | nuclear magnetic resonance |
| O.D. | outer diameter |
| PD | polydispersity |
| Ph | phenyl |
| ppm | parts per million |
| PTFE | polytetrafluoroethylene |

TABLE 7-continued

Abbreviations

| Abbreviation | Definition |
|---|---|
| RH | relative humidity |
| RT | room temperature of 25° C. |
| s | seconds |
| SiH content | hydrogen, as silicon bonded hydrogen, as measured by 29 Si NMR |
| THF | tetrahydrofuran |
| μL | microliter |
| pm | micrometer |
| Vi | vinyl |

All amounts, ratios, and percentages are by weight unless otherwise indicated. The amounts of all starting materials in a composition total 100% by weight. The SUMMARY and ABSTRACT are hereby incorporated by reference. The articles 'a', 'an', and 'the' each refer to one or more, unless otherwise indicated by the context of specification. The singular includes the plural unless otherwise indicated. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein.

What is claimed is:

1. A composition for forming a release coating, said composition comprising:
(A) an organopolysiloxane comprising the reaction product of:
(i) a silicone resin having the formula $(R^1_y R^2_{3-y} SiO_{1/2})_x (SiO_{4/2})_{1.0} (ZO_{1/2})_w$, wherein each $R^1$ is an independently selected hydrocarbyl group having from 1 to 32 carbon atoms; each $R^2$ is independently selected from $R^1$, an alkoxy group, and a hydroxyl group; Z is independently H or an alkyl group; y is an integer from 1 to 3 and is independently selected in each siloxy unit indicated by subscript x; subscript x is from 0.05 to 0.80; and subscript w is from 0 to 3; and
(ii) a cyclic siloxane having the formula $(R^1_2 SiO_{2/2})_n$, where $R^1$ is defined above and n is an integer from 3 to 15;
in the presence of a polymerization catalyst; and
(B) an organopolysiloxane including an average of at least two silicon-bonded ethylenically unsaturated groups per molecule;
wherein the (A) organopolysiloxane has the formula $(R^1_y R^2_{3-y} SiO_{1/2})_x (R^1_2 SiO_{2/2})_m (SiO_{4/2})_{1.0} (ZO_{1/2})_w$ where each $R^1$ and $R^2$ is independently selected and defined above, subscripts y and x are defined above, wherein subscript m is from 3 to 3,000; each Z is independently selected and defined above, and subscript w is defined above.

2. The composition of claim 1, wherein: (i) each R1 is an independently selected alkyl group or alkenyl group; (ii) subscript y is 3; (iii) subscript x is from 0.20 to 0.80; (iv) subscript n is 4 or 5; or (v) any combination of (i) to (iv).

3. The composition of claim 1, wherein the polymerization catalyst comprises a phosphazene base catalyst.

4. The composition of claim 1, wherein subscript x is from 0.30 to 0.75.

5. The composition of claim 1, wherein the (A) organopolysiloxane includes an average of at least two silicon-bonded ethylenically unsaturated groups per molecule.

6. The composition of claim 1, further comprising a hydrosilylation-reaction inhibitor.

7. The composition of claim 1, further comprising:
(C) an organosilicon compound including an average of at least two silicon-bonded hydrogen atoms per molecule; and
(D) a hydrosilylation-reaction catalyst.

8. The composition of claim 7, wherein:
(i) the (C) organosilicon compound comprises an organohydrogensiloxane including an average of at least two pendent silicon-bonded hydrogen atoms per molecule;
(ii) the molar ratio of SiH to silicon-bonded ethylenically unsaturated groups is from 1:1 to 5:1; or
(iii) both (i) and (ii).

9. The composition of claim 1, comprising the (A) organopolysiloxane in an amount of from 0.5 to 10 weight percent based on the total weight of the composition.

10. The composition of claim 1, comprising the (B) organopolysiloxane in an amount of from 80 to 99 weight percent based on the total weight of the composition.

11. A method of preparing the composition of claim 1, said method comprising:
reacting the (i) silicone resin and the (ii) cyclic siloxane in the presence of the polymerization catalyst to give the (A) organopolysiloxane; and
combining the (A) organopolysiloxane and the (B) organopolysiloxane to give the composition.

12. A method of forming a coated substrate, said method comprising:
applying a composition on the substrate; and
curing the composition to give a release coating on the substrate, thereby forming the coated substrate;
wherein the composition is the composition of claim 7.

13. The method of claim 12, wherein the substrate comprises cellulose and/or a polymer.

14. A coated substrate comprising a release coating disposed on a substrate formed in accordance with the method of claim 12.

15. The composition of claim 1, wherein the (i) silicone resin comprises a plurality of Q siloxy units clustered together, and wherein the (i) silicone resin is a solid.

* * * * *